(12) United States Patent
Tablan et al.

(10) Patent No.: US 10,963,497 B1
(45) Date of Patent: Mar. 30, 2021

(54) MULTI-STAGE QUERY PROCESSING

(71) Applicant: Amazon Technologies, Inc., Seattle, WA (US)

(72) Inventors: Mihai Valentin Tablan, Cambridge (GB); Sina Samangooei, Cambridge (GB); Arpit Mittal, Cambridge (GB); David Spike Palfrey, Cambridge (GB); Emilio Monti, Cambridge (GB); Pedro Ribeiro, Cambridge (GB); Benjamin David Scott, Cambridge (GB); Petra Elisabeth Holmes, Over (GB); Dianhuan Lin, Cambridge (GB)

(73) Assignee: Amazon Technologies, Inc., Seattle, WA (US)

( * ) Notice: Subject to any disclaimer, the term of this patent is extended or adjusted under 35 U.S.C. 154(b) by 560 days.

(21) Appl. No.: 15/083,790

(22) Filed: Mar. 29, 2016

(51) Int. Cl.
 G06F 16/33 (2019.01)
(52) U.S. Cl.
 CPC ...... G06F 16/3334 (2019.01); G06F 16/3344 (2019.01)
(58) Field of Classification Search
 CPC ......... G06F 17/30663; G06F 17/30684; G06F 16/3334; G06F 16/3344
 See application file for complete search history.

(56) References Cited

U.S. PATENT DOCUMENTS

| | | | |
|---|---|---|---|
| 7,016,827 B1* | 3/2006 | Ramaswamy | G10L 15/1822 704/9 |
| 7,685,201 B2* | 3/2010 | Zeng | G06F 16/338 707/748 |
| 7,860,815 B1* | 12/2010 | Tangirala | G06N 5/02 706/45 |
| 8,244,752 B2* | 8/2012 | Buehrer | H04L 47/10 707/769 |
| 8,341,157 B2* | 12/2012 | Schulman | G06F 16/951 707/737 |
| 8,374,875 B2* | 2/2013 | Genly | H04N 5/4403 704/270 |
| 8,484,031 B1* | 7/2013 | Yeracaris | G10L 15/30 704/270.1 |
| 8,666,983 B2* | 3/2014 | Brill | G06F 16/3329 707/737 |

(Continued)

*Primary Examiner* — Miranda Le
(74) *Attorney, Agent, or Firm* — Pierce Atwood LLP

(57) ABSTRACT

A query parsing system uses a multi-stage process to parse the text of incoming queries before attempting to answer the queries. The multi-stage configuration involves a first trained classifier to determine the query type, or intent, of the text and a plurality of second trained classifiers, where each of the second trained classifiers is configured particularly for one specific respective query type. During query processing, the first trained classifier is used on the text to identify the query type. A second trained classifier for that specific identified query type is then found and used on the text to identify what strings in the text correspond to specific entities needed to resolve the query. The identified text strings and query type are then placed into a form understandable by a knowledge base and sent to the knowledge base for resolution. The classifiers may be trained using queries and answers previously processed by the knowledge base using a rules/template resolution process.

18 Claims, 13 Drawing Sheets

(56) References Cited

U.S. PATENT DOCUMENTS

| | | | | |
|---|---|---|---|---|
| 8,688,447 | B1* | 4/2014 | De | G10L 15/1815 704/231 |
| 8,756,218 | B1* | 6/2014 | Spilsbury | G06F 16/951 707/713 |
| 8,775,191 | B1* | 7/2014 | Sharifi | G10L 15/26 704/275 |
| 8,843,470 | B2* | 9/2014 | Li | G06F 16/3331 707/708 |
| 8,898,140 | B2* | 11/2014 | Cooper | G06F 17/2785 707/711 |
| 9,223,853 | B2* | 12/2015 | Shukla | G06F 16/3338 |
| 9,269,354 | B2* | 2/2016 | Gandrabur | G10L 15/1815 |
| 9,286,910 | B1* | 3/2016 | Li | G10L 25/48 |
| 9,330,661 | B2* | 5/2016 | Mamou | G10L 15/08 |
| 9,336,485 | B2* | 5/2016 | Haggar | G06F 17/30684 |
| 9,514,185 | B2* | 12/2016 | Mungi | G06F 16/24522 |
| 9,552,422 | B2* | 1/2017 | Kasterstein | G06F 16/9535 |
| 9,639,609 | B2* | 5/2017 | Li | G06F 17/30864 |
| 2003/0233618 | A1* | 12/2003 | Wan | G06F 16/81 715/241 |
| 2007/0016399 | A1* | 1/2007 | Gao | G06F 17/2818 704/5 |
| 2012/0036145 | A1* | 2/2012 | Tunstall-Pedoe | G06F 16/24534 707/760 |
| 2014/0040274 | A1* | 2/2014 | Aravamudan | G06F 16/335 707/741 |
| 2015/0039292 | A1* | 2/2015 | Suleman | G06F 17/289 704/9 |
| 2015/0081294 | A1* | 3/2015 | Hsu | G10L 15/26 704/235 |
| 2016/0035348 | A1* | 2/2016 | Kleindienst | G06F 17/30905 704/235 |
| 2016/0132501 | A1* | 5/2016 | Mengle | G06F 16/288 707/771 |
| 2016/0188726 | A1* | 6/2016 | Shang | G06F 16/9032 707/706 |
| 2016/0292282 | A1* | 10/2016 | Khator | G06F 16/9535 |
| 2017/0024465 | A1* | 1/2017 | Yeh | G10L 25/54 |
| 2017/0177715 | A1* | 6/2017 | Chang | G06F 17/2785 |

* cited by examiner

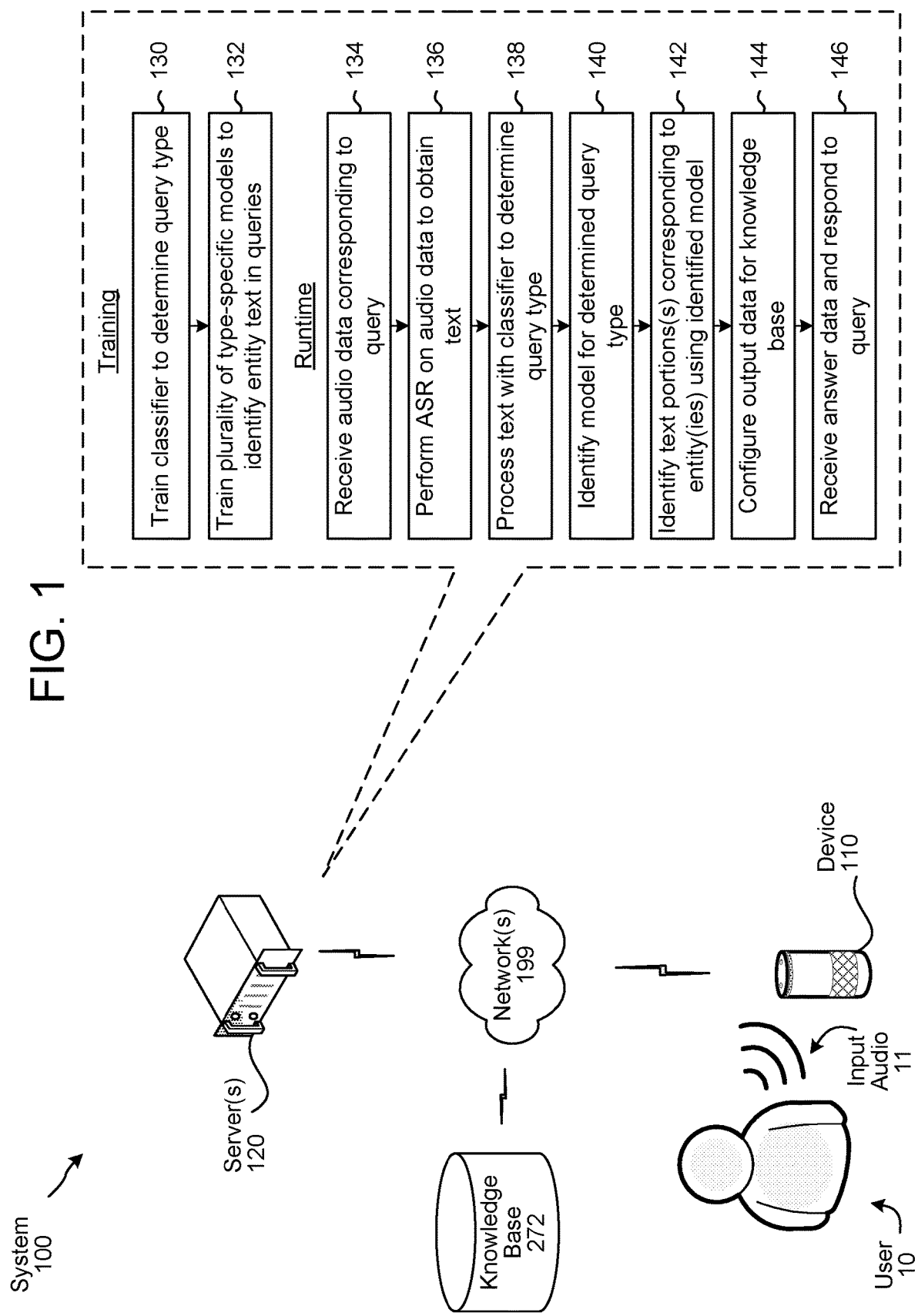

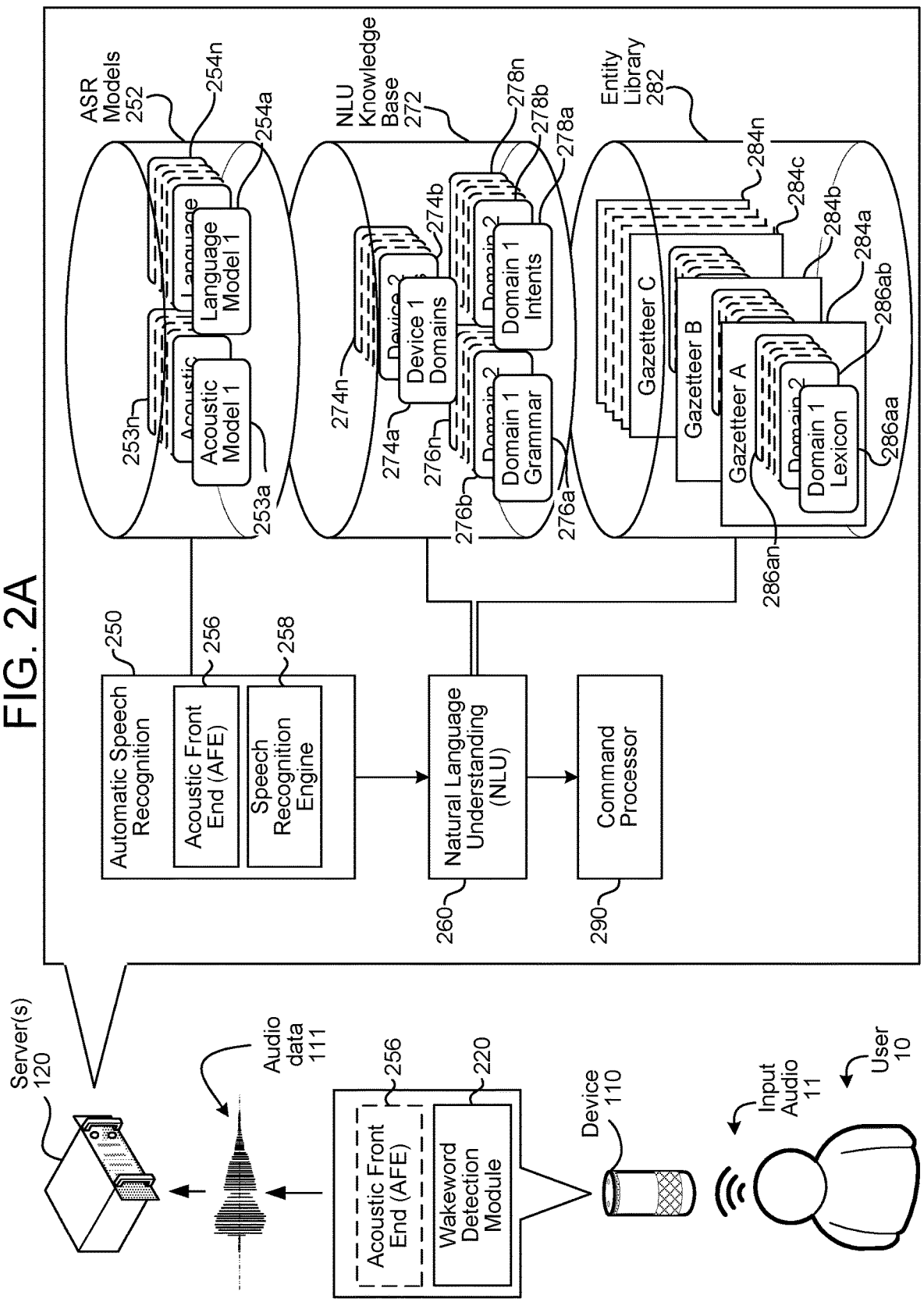

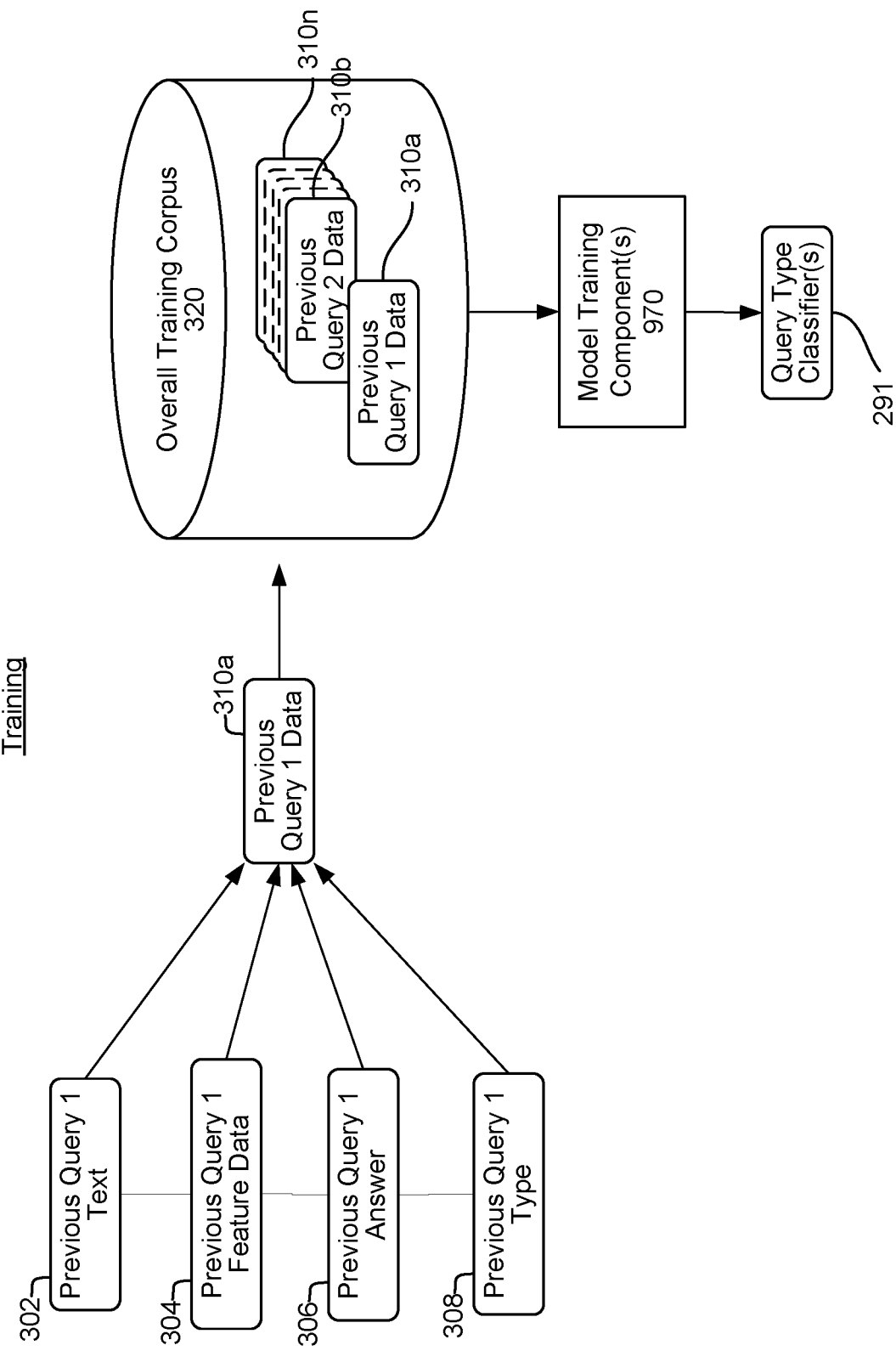

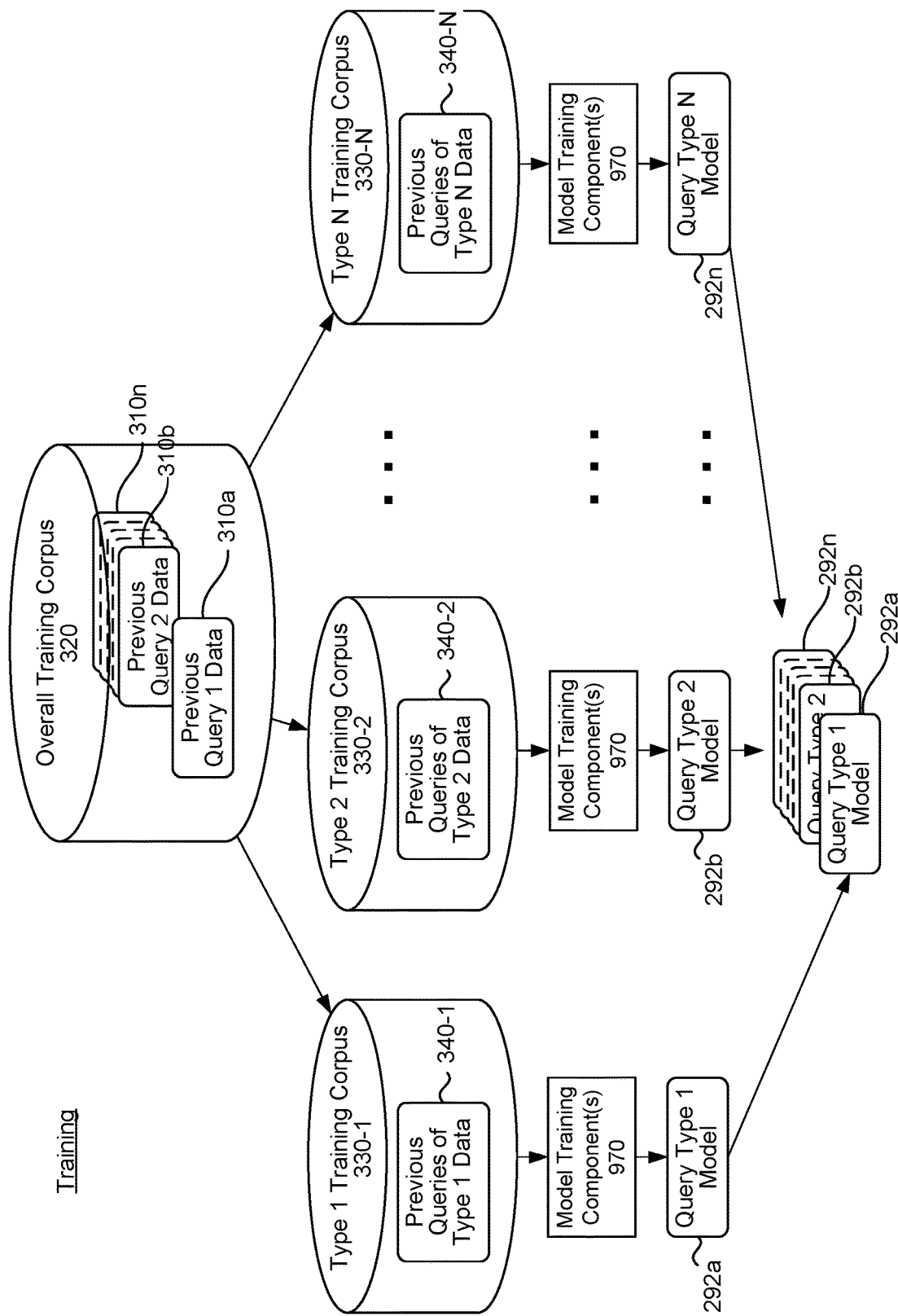

Runtime

MULTI-STAGE QUERY PROCESSING

BACKGROUND

Speech recognition systems have progressed to the point where humans can interact with computing devices entirely relying on speech. Such systems employ techniques to identify the words spoken by a human user based on the various qualities of a received audio input. Speech recognition combined with natural language understanding processing techniques enable speech-based user control of a computing device to perform tasks based on the user's spoken commands. The combination of speech recognition and natural language understanding processing techniques is commonly referred to as speech processing. Speech processing may also convert a user's speech into text data which may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 1 illustrates a system for configuring and operating a system to parse incoming queries according to embodiments of the present disclosure.

FIG. 2A is a conceptual diagram of a speech processing system according to embodiments of the present disclosure.

FIGS. 3A-3C illustrate training of machine learning models to be used at runtime for query processing according to embodiments of the present disclosure.

DETAILED DESCRIPTION

Figure 2B:
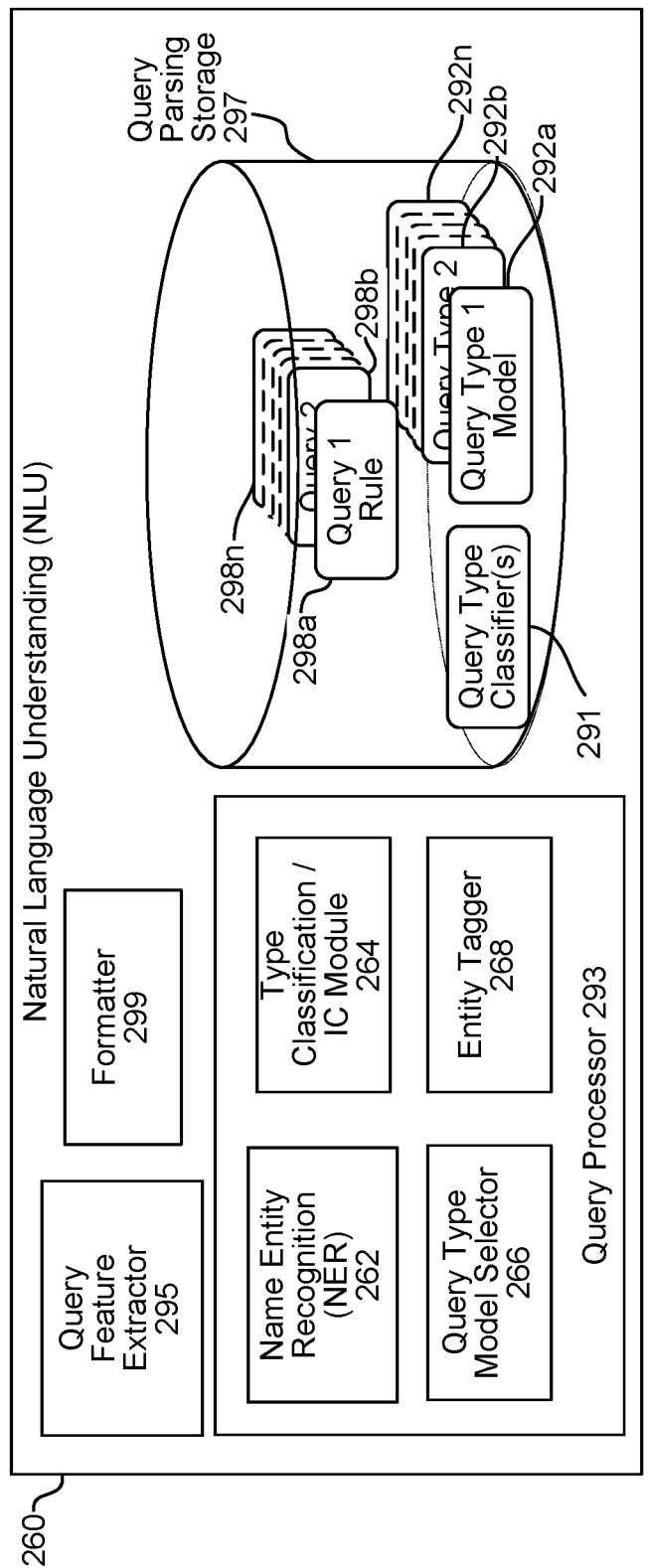
FIG. 2B is a conceptual diagram of query processing components according to embodiments of the present disclosure.

Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU are often used together as part of a speech processing system.

ASR and NLU can be computationally expensive. That is, significant computing resources may be needed to process ASR and NLU processing within a reasonable time frame. Because of this, a distributed computing environment may be used when performing speech processing. A typical such distributed environment may involve a local device having one or more microphones being configured to capture sounds from a user speaking and convert those sounds into an audio signal. The audio signal/data may then be sent to a downstream remote device for further processing, such as converting the audio signal into an ultimate command. The command may then be executed by a combination of remote and local devices depending on the command itself.

In certain situations, a user utterance may include a query. The query may include an input to the system to provide information or execute a command. That is, the user may ask the system to provide some information in response to the utterance. As part of NLU processing, in order to respond to a user's query, the system may rely on a knowledge base to obtain or confirm information requested by the query. A knowledge base is a data store that includes facts organized in a particular manner that may be used to respond to user queries. In order to retrieve answer data from a knowledge base, a query must first be parsed into a form recognizable by the knowledge base.

There are many types of queries that a user may pose from simple single-fact questions (for example, "what is the capital of France?") to more detailed questions involving time, place, multiple entities, etc. (for example, "when was Tom Cruise married to Nicole Kidman?"). Typical query resolution systems rely on a rule/template based approach. In such an approach, a series of rules may be used to analyze the incoming query text to identify the intent of the query (i.e., what information is being sought) and what entities are named in the query that are needed to provide the desired information. An entity is a person, place, thing, etc. that has an identity, though as noted below, identifying a mention of an entity in query text (entity tagging) is not the same as actually resolving what the actual entity is (a process called named entity resolution). Determining what, if any, entity is referred to in a query may be a necessary step to resolving (i.e., answering) the query. In a rule/template based approach, rules may be applied to query text, where the results of each rule's processing may be given a confidence score where the rule results corresponding to a highest confidence score are selected, parsed and passed on to the knowledge base.

One drawback to a rule/template based approach is that query structures understandable by the rule/template can be rigid, only allowing users to phrase questions in a certain way. For example, a rule configured to process a query in the form "what is the capital of France?" may be unable to process a query in the form "France has what capital" even though the questions have a same query type (e.g., asking for a capital city) and are asking for precisely the same information (e.g., the capital of France). Thus, to provide robust results, many rules/templates may be needed to process a single query type. Expanded across many thousands of query types (and many different ways to express a particularly query), it can become difficult to configure and operate a rules based query resolution approach that is robust to different query formulations.

In order to make a query resolution system more robust and useful, offered is a system that breaks the query processing into multiple stages, where a first stage identifies a type of a query and a second stage identifies where in the query text entities are mentioned. As noted below, each stage can use a machine learning model that is trained on data previously processed by the knowledge base (for example queries previously handled by a rule/template based approach). Further, the second stage can use models that are specifically trained based on query types so that each query type has its own second stage model. The multi-stage approach described below may result in a more robust and useful query resolution system.

FIG. 1 shows a system 100 configured to resolve user queries. Although FIG. 1, and lower figures/discussion, illustrate the operation of the system in a particular order, the steps described may be performed in a different order (as well as certain steps removed or added) without departing from the intent of the disclosure. As shown in FIG. 1, a system 100 may include one or more devices 110 local to user(s) 10, as well as one or more networks 199 and one or more servers 120 connected to device 110 across network(s) 199. The server(s) 120 (which may be one or more different physical devices) may be capable of performing traditional speech processing (such as ASR, NLU, query parsing, etc.) as described herein. A single server may be capable of performing all speech processing or multiple server(s) 120 may combine to perform the speech processing. Further, the server(s) 120 may be configured to execute certain commands, such as answering queries spoken by user 10. In addition, certain speech detection or command execution functions may be performed by device 110.

As shown in FIG. 1, during a training process the system trains (130) one or more classifiers to determine a query type using input query text. The system may also train (132) a plurality of type-specific machine learning models that can be used identify text portions corresponding to entity mentions in input query text. That is, the system may train many different models, where each model corresponds to a specific query type (i.e., corresponds to a particular piece of information being sought in the query or corresponds to a subject matter of the query). For query text of that query type, the specific model may recognize what text in the query text corresponds to an entity mention relevant to that query type. The text portion corresponding to the entity may then be used to formulate output data to the knowledge base to retrieve answer data (i.e., fact data to be used in responding to the user's query). The output data may be configured as a structured semantic query, which is particularly formatted to be in a form understandable (and processable) by the knowledge base. The training of the classifier/models may use various machine learning techniques and may involve training data made up from previously answered queries (as explained in more detail below with regard to FIGS. 3A-3C.

When the classifier and models are trained and operational they may be used in runtime processing. For example, at runtime a user 10 may speak an utterance (represented by input audio 11) including a query to a device 110. The device 110 may convert the audio 11 into audio data 111 and send the audio data to the server(s) 120. The server(s) 120 may then receive (134) the audio data corresponding to the query and perform (136) ASR processing on the audio data to obtain text. The server(s) 120 may then process (138) the text with the classifier to determine a query type corresponding to the text. Using the determined query type, the system may identify (140) a particular entity-text identifying model (also called a "tagger" or "entity tagger") trained for that query type from among a plurality of trained models. The server(s) 120 may then process the text using the identified model to identify (142) text portion(s) within the query text that correspond to one or more entities. The server(s) 120 may then configure output data for sending to the knowledge base 272. The output data may include the text portion(s) identified above, along with some indication of the query type. The output data may be formatted as structured semantic query, which may include a particular arrangement of text of the query so the knowledge base may operate on the output data. For example, if the knowledge base is configured to operate on data in such format(s), the output data may be placed in a format according to SQL (Structured Query Language) or SPARQL (Protocol and RDF (Resource Description Framework) Query Language). The system may then send the output data to the knowledge base 272 and receive (146) answer data in response. The system may then form data to respond to the query, which may involve creating output audio data including synthesized speech that includes the answer data.

As an example of a runtime process, the user may speak a query of "what is the capital of France." The local user device 110 may convert the spoken query into audio data and send the audio data to the server(s) 120. The server(s) 120 may then convert the audio data into text corresponding to "what is the capital of France." The server(s) 120 may then process the query text with the classifier to determine that the type of the query is a "request for capital." The server(s) 120 may then identify the entity tagging model corresponding to the "request for capital" query type. The server(s) 120 may then process the query text using the specific entity tagging model to determine that the text "France" corresponds to an entity (although the server may not yet recognize what entity the text "France" necessarily corresponds to). The server(s) 120 may then configure output data to send to the knowledge base to obtain an answer to the query. For example, if the knowledge base 272 operates in tuple form, the output data may be formed as a structured semantic query, for example a tuple (i.e., finite ordered list of elements) with a missing variable for the desired answer corresponding to the identified entity text portions and query type, such as [capital, France, X] where "capital" defines the query type/intent of the query, "France" defines the subject entity for the query, and "X" defines the answer data being sought. The knowledge base 272 may then return answer data to the server(s), which may be in the form of short text (such as "Paris"), in tuple form, in complete sentence text ("The capital of France is Paris," "Paris the capital of France," or the like) or in some other form. The server(s) 120 may then formulate response text including the answer data and may respond to the query using the answer data, such as by performing text-to-speech processing using the answer data to determine output audio data that will be sent to the user device 110 for playback to the user 10.

Further details of training and operating query parsing models are discussed below, following a discussion of the overall speech processing system of FIGS. 2A and 2B. FIG. 2A is a conceptual diagram of how a spoken utterance is traditionally processed, allowing a system to capture and execute commands spoken by a user, such as spoken commands that may follow a wakeword. The various components illustrated may be located on a same or different physical devices. Communication between various components illustrated in FIG. 2A may occur directly or across a network 199. An audio capture component, such as a microphone of device 110, captures audio 11 corresponding to a spoken utterance. The device 110, using a wakeword detection module 220, then processes the audio, or audio data corresponding to the audio, to determine if a keyword (such as a wakeword) is detected in the audio. Following detection of a wakeword, the device sends audio data 111 corresponding to the utterance, to a server 120 that includes an ASR module 250. The audio data 111 may be output from an acoustic front end (AFE) 256 located on the device 110 prior to transmission. Or the audio data 111 may be in a different form for processing by a remote AFE 256, such as the AFE 256 located with the ASR module 250.

The wakeword detection module 220 works in conjunction with other components of the device, for example a microphone (not pictured) to detect keywords in audio 11. For example, the device 110 may convert audio 11 into audio data, and process the audio data with the wakeword detection module 220 to determine whether speech is detected, and if so, if the audio data comprising speech matches an audio signature and/or model corresponding to a particular keyword.

The device 110 may use various techniques to determine whether audio data includes speech. Some embodiments may apply voice activity detection (VAD) techniques. Such techniques may determine whether speech is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the device 110 may implement a limited classifier configured to distinguish speech from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in speech storage, which acoustic models may include models corresponding to speech, noise (such as environmental noise or background noise), or silence. Still other techniques may be used to determine whether speech is present in the audio input.

Once speech is detected in the audio received by the device 110 (or separately from speech detection), the device 110 may use the wakeword detection module 220 to perform wakeword detection to determine when a user intends to speak a command to the device 110. This process may also be referred to as keyword detection, with the wakeword being a specific example of a keyword. Specifically, keyword detection is typically performed without performing linguistic analysis, textual analysis or semantic analysis. Instead, incoming audio (or audio data) is analyzed to determine if specific characteristics of the audio match preconfigured acoustic waveforms, audio signatures, or other data to determine if the incoming audio "matches" stored audio data corresponding to a keyword.

Thus, the wakeword detection module 220 may compare audio data to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds hidden Markov models (HMM) for each key wakeword word and non-wakeword speech signals respectively. The non-wakeword speech includes other spoken words, background noise etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating hybrid DNN-HMM decoding framework. In another embodiment the wakeword spotting system may be built on deep neural network (DNN)/recursive neural network (RNN) structures directly, without HMM involved. Such a system may estimate the posteriors of wakewords with context information, either by stacking frames within a context window for DNN, or using RNN. Following-on posterior threshold tuning or smoothing is applied for decision making. Other techniques for wakeword detection, such as those known in the art, may also be used.

Once the wakeword is detected, the local device 110 may "wake" and begin transmitting audio data 111 corresponding to input audio 11 to the server(s) 120 for speech processing. Audio data corresponding to that audio may be sent to a server 120 for routing to a recipient device or may be sent to the server for speech processing for interpretation of the included speech (either for purposes of enabling voice-communications and/or for purposes of executing a command in the speech). The audio data 111 may include data corresponding to the wakeword, or the portion of the audio data corresponding to the wakeword may be removed by the local device 110 prior to sending. Further, a local device 110 may "wake" upon detection of speech/spoken audio above a threshold, as described herein. Upon receipt by the server(s) 120, an ASR module 250 may convert the audio data 111 into text. The ASR transcribes audio data into text data representing the words of the speech contained in the audio data. The text data may then be used by other components for various purposes, such as executing system commands, inputting data, etc. A spoken utterance in the audio data is input to a processor configured to perform ASR which then interprets the utterance based on the similarity between the utterance and pre-established language models 254 stored in an ASR model knowledge base (ASR Models Storage 252). For example, the ASR process may compare the input audio data with models for sounds (e.g., subword units or phonemes) and sequences of sounds to identify words that match the sequence of sounds spoken in the utterance of the audio data.

The different ways a spoken utterance may be interpreted (i.e., the different hypotheses) may each be assigned a probability or a confidence score representing the likelihood that a particular set of words matches those spoken in the utterance. The confidence score may be based on a number of factors including, for example, the similarity of the sound in the utterance to models for language sounds (e.g., an acoustic model 253 stored in an ASR Models Storage 252), and the likelihood that a particular word which matches the sounds would be included in the sentence at the specific location (e.g., using a language or grammar model). Thus each potential textual interpretation of the spoken utterance (hypothesis) is associated with a confidence score. Based on the considered factors and the assigned confidence score, the ASR process 250 outputs the most likely text recognized in the audio data. The ASR process may also output multiple hypotheses in the form of a lattice or an N-best list with each hypothesis corresponding to a confidence score or other score (such as probability scores, etc.).

The device or devices performing the ASR processing may include an acoustic front end (AFE) 256 and a speech recognition engine 258. The acoustic front end (AFE) 256 transforms the audio data from the microphone into data for processing by the speech recognition engine. The speech recognition engine 258 compares the speech recognition data with acoustic models 253, language models 254, and other data models and information for recognizing the speech conveyed in the audio data. The AFE may reduce noise in the audio data and divide the digitized audio data into frames representing a time intervals for which the AFE determines a number of values, called features, representing the qualities of the audio data, along with a set of those values, called a feature vector, representing the features/qualities of the audio data within the frame. Many different features may be determined, as known in the art, and each feature represents some quality of the audio that may be useful for ASR processing. A number of approaches may be used by the AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The speech recognition engine 258 may process the output from the AFE 256 with reference to information stored in speech/model storage (252). Alternatively, post front-end processed data (such as feature vectors) may be received by the device executing ASR processing from another source besides the internal AFE. For example, the device 110 may process audio data into feature vectors (for example using an on-device AFE 256) and transmit that information to a server across a network 199 for ASR processing. Feature vectors may arrive at the server encoded, in which case they may be decoded prior to processing by the processor executing the speech recognition engine 258.

The speech recognition engine 258 attempts to match received feature vectors to language phonemes and words as known in the stored acoustic models 253 and language models 254. The speech recognition engine 258 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR process will output speech results that make sense grammatically. The specific models used may be general models or may be models corresponding to a particular domain, such as music, banking, etc.

The speech recognition engine 258 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound.

Following ASR processing, the ASR results may be sent by the speech recognition engine 258 to other processing components, which may be local to the device performing ASR and/or distributed across the network(s) 199. For example, ASR results in the form of a single textual representation of the speech, an N-best list including multiple hypotheses and respective scores, lattice, etc. may be sent to a server, such as server 120, for natural language understanding (NLU) processing, such as conversion of the text into commands for execution, either by the device 110, by the server 120, or by another device (such as a server running a specific application like a search engine, etc.).

The device performing NLU processing 260 (e.g., server 120) may include various components, including potentially dedicated processor(s), memory, storage, etc. As shown in more detail in FIG. 2B, a device configured for NLU processing may include a query feature extractor 295 configured to process incoming query text (and other data that may be used in parsing a query) to obtain feature data that describes the incoming query and may be used in parsing and resolving (i.e., answering) the query. The NLU component 260 may also include a query processor 293 that takes the query text and/or the output from the query feature extractor 295 and parses/processes the query for output to the formatter 299, which formats the output from the query processor 293 for eventual passing to the knowledge base 272. The NLU component 260 may also include query parsing storage 297 which may include rules 298a-298n that may be used by the query processor 293 to analyze incoming queries in a rules/templates based approach. The query parsing storage 297 may also include one or more query type classifier(s) 291 that may be used by the type classification module 264 to determine a type for an incoming query. The query parsing storage 297 may also include query type models 292a-292n, where each query type model is used by an entity tagger 268 to identify, for query text corresponding to the same query type as the query type model, text portions corresponding to entities mentioned in the query text, as explained below.

The NLU component may also include a named entity resolution (NER) module 252 which is used to actually identify entities in query text (i.e., link a text portion to an actual entity recognizable by the system) for ultimate command execution. To do so the NER process may utilize gazetteer information (284a-284n) stored in entity library storage 282. The gazetteer information may be used for entity resolution, for example matching ASR results with different entities (such as song titles, contact names, etc.) Gazetteers may be linked to users (for example a particular gazetteer may be associated with a specific user's music collection), may be linked to certain domains (such as shopping), or may be organized in a variety of other ways.

Generally, the NLU process takes textual input (such as processed from ASR 250 based on the utterance 11) and attempts to make a semantic interpretation of the text. That is, the NLU process determines the meaning behind the text based on the individual words and then implements that meaning. NLU processing 260 interprets a text string to derive an intent or a desired action from the user as well as the pertinent pieces of information in the text that allow a device (e.g., device 110) to complete that action. For example, if a spoken utterance is processed using ASR 250 and outputs the text "call mom" the NLU process may determine that the user intended to activate a telephone in his/her device and to initiate a call with a contact matching the entity "mom" (which may involve a downstream command processor 290 linked with a telephone application).

The NLU may process several textual inputs related to the same utterance. For example, if the ASR 250 outputs N text segments (as part of an N-best list), the NLU may process all N outputs to obtain NLU results.

As will be discussed further below, the NLU process may be configured to parsed and tagged to annotate text as part of NLU processing. For example, for the text "call mom," "call" may be tagged as a command (to execute a phone call) and "mom" may be tagged as a specific entity and target of the command (and the telephone number for the entity corresponding to "mom" stored in a contact list may be included in the annotated result). Further, the NLU process may be used to provide answer data in response to queries, for example using the knowledge base 272.

To correctly perform NLU processing of speech input, the NLU process 260 may be configured to determine a "domain" of the utterance so as to determine and narrow down which services offered by the endpoint device (e.g., server 120 or device 110) may be relevant. For example, an endpoint device may offer services relating to interactions with a telephone service, a contact list service, a calendar/scheduling service, a music player service, etc. Words in a single text query may implicate more than one service, and some services may be functionally linked (e.g., both a telephone service and a calendar service may utilize data from the contact list).

The named entity recognition module 262 receives a query in the form of ASR results and attempts to identify relevant grammars and lexical information that may be used to construe meaning. To do so, a name entity recognition module 262 may begin by identifying potential domains that may relate to the received query. The NLU knowledge base 272 includes a databases of devices (274a-274n) identifying domains associated with specific devices. For example, the device 110 may be associated with domains for music, telephony, calendaring, contact lists, and device-specific communications, but not video. In addition, the entity library may include database entries about specific services on a specific device, either indexed by Device ID, User ID, or Household ID, or some other indicator.

A domain may represent a discrete set of activities having a common theme, such as "shopping", "music", "calendaring", etc. As such, each domain may be associated with a particular language model and/or grammar database (276a-276n), a particular set of intents/actions (278a-278n), and a particular personalized lexicon (286). Each gazetteer (284a-284n) may include domain-indexed lexical information associated with a particular user and/or device. For example, the Gazetteer A (284a) includes domain-index lexical information 286aa to 286an. A user's music-domain lexical information might include album titles, artist names, and song names, for example, whereas a user's contact-list lexical information might include the names of contacts. Since every user's music collection and contact list is presumably different, this personalized information improves entity resolution.

A query is processed applying the rules, models, and information applicable to each identified domain. For example, if a query potentially implicates both communications and music, the query will be NLU processed using the grammar models and lexical information for communications, and will be processed using the grammar models and lexical information for music. The responses based on the query produced by each set of models is scored (discussed further below), with the overall highest ranked result from all applied domains is ordinarily selected to be the correct result.

A type classification/intent classification (IC) module 264 parses the query to determine an intent or intents for each identified domain, where the intent corresponds to the action to be performed or information that is sought that is responsive to the query. Each domain is associated with a database (278a-278n) of words linked to intents. For example, a music intent database may link words and phrases such as "quiet," "volume off," and "mute" to a "mute" intent. The IC module 264 identifies potential intents for each identified domain by comparing words in the query to the words and phrases in the intents database 278. Traditionally, the determination of an intent by the IC module is performed using a set of rules or templates (described further below) that are processed against the incoming text to identify a matching intent.

In order to generate a particular interpreted response, the NER 262 applies the grammar models and lexical information associated with the respective domain to actually recognize one or more entities in the text of the query. Each grammar model 276 includes the names of entities (i.e., nouns) commonly found in speech about the particular domain (i.e., generic terms), whereas the lexical information 286 from the gazetteer 284 is personalized to the user(s) and/or the device. For instance, a grammar model associated with the shopping domain may include a database of words commonly used when people discuss shopping.

The intents identified by the IC module 264 are linked to domain-specific grammar frameworks (included in 276) with "slots" or "fields" to be filled. Each slot/field corresponds to a portion of the query text that the system believes corresponds to an entity. For example, if "play music" is an identified intent, a grammar (276) framework or frameworks may correspond to sentence structures such as "Play {Artist Name}," "Play {Album Name}," "Play {Song name}," "Play {Song name} by {Artist Name}," etc. However, to make resolution more flexible, these frameworks would ordinarily not be structured as sentences, but rather based on associating slots with grammatical tags.

For example, the NER module 260 may parse the query to identify words as subject, object, verb, preposition, etc., based on grammar rules and/or models, prior to recognizing named entities. The identified verb may be used by the IC module 264 to identify intent, which is then used by the NER module 262 to identify frameworks. A framework for an intent of "play" may specify a list of slots/fields applicable to play the identified "object" and any object modifier (e.g., a prepositional phrase), such as {Artist Name}, {Album Name}, {Song name}, etc. The NER module 260 then searches the corresponding fields in the domain-specific and personalized lexicon(s), attempting to match words and phrases in the query tagged as a grammatical object or object modifier with those identified in the database(s).

This process includes semantic tagging, which is the labeling of a word or combination of words according to their type/semantic meaning. Parsing may be performed using heuristic grammar rules, or an NER model may be constructed using techniques such as hidden Markov models, maximum entropy models, log linear models, conditional random fields (CRF), and the like.

For instance, a query of "play mother's little helper by the rolling stones" might be parsed and tagged as {Verb}: "Play," {Object}: "mother's little helper," {Object Preposition}: "by," and {Object Modifier}: "the rolling stones." At this point in the process, "Play" is identified as a verb based on a word database associated with the music domain, which the IC module 264 will determine corresponds to the "play music" intent. No determination has been made as to the meaning of "mother's little helper" and "the rolling stones," but based on grammar rules and models, it is determined that the text of these phrases relate to the grammatical object (i.e., entity) of the query.

The frameworks linked to the intent are then used to determine what database fields should be searched to determine the meaning of these phrases, such as searching a user's gazette for similarity with the framework slots. So a framework for "play music intent" might indicate to attempt to resolve the identified object based {Artist Name}, {Album Name}, and {Song name}, and another framework for the same intent might indicate to attempt to resolve the object modifier based on {Artist Name}, and resolve the object based on {Album Name} and {Song Name} linked to the identified {Artist Name}. If the search of the gazetteer does not resolve the a slot/field using gazetteer information, the NER module 262 may search the database of generic words associated with the domain (in the knowledge base 272). So for instance, if the query was "play songs by the rolling stones," after failing to determine an album name or song name called "songs" by "the rolling stones," the NER 262 may search the domain vocabulary for the word "songs." In the alternative, generic words may be checked before the gazetteer information, or both may be tried, potentially producing two different results.

The comparison process used by the NER module 262 may classify (i.e., score) how closely a database entry compares to a tagged query word or phrase, how closely the grammatical structure of the query corresponds to the applied grammatical framework, and based on whether the database indicates a relationship between an entry and information identified to fill other slots of the framework.

The NER modules 262 may also use contextual operational rules to fill slots. For example, if a user had previously requested to pause a particular song and thereafter requested that the voice-controlled device to "please un-pause my music," the NER module 262 may apply an inference-based rule to fill a slot associated with the name of the song that the user currently wishes to play—namely the song that was playing at the time that the user requested to pause the music.

The results of NLU processing may be tagged to attribute meaning to the query. So, for instance, "play mother's little helper by the rolling stones" might produce a result of: {domain} Music, {intent} Play Music, {artist name} "rolling stones," {media type} SONG, and {song title} "mother's little helper." As another example, "play songs by the rolling stones" might produce: {domain} Music, {intent} Play Music, {artist name} "rolling stones," and {media type} SONG.

The output from the NLU processing (which may include tagged text, commands, etc.) may then be sent to a command processor 290, which may be located on a same or separate server 120 as part of system 100. The destination command processor 290 may be determined based on the NLU output. For example, if the NLU output includes a command to play music, the destination command processor 290 may be a music playing application, such as one located on device 110 or in a music playing appliance, configured to execute a music playing command. If the NLU output includes a search request, the destination command processor 290 may include a search engine processor, such as one located on a search server, configured to execute a search command.

For queries that include a request for information, rather than a command, a query parsing component 293 may analyze and tag/format query text by analyzing input text and outputting data that may be used to respond to a query where the output data may be formatted into a structured form used by the knowledge base 272, for example, as described in the Knowledge System documents discussed below. In an example, the query parsing component 293 may format the source data objects into one or more corresponding classes, relations, data/document objects, facts, time, negative facts, categories, etc. The query parsing component 293 may be based on the models and programming available to the query parsing component 293. Such models may be grammar based, rule based, or constructed in a different manner, such as using the multi-stage approach described below. The query parsing component 293 may also be configured to translate slang terminology, abbreviated terms, synonyms, and other queries into textual expressions that can be understood and used by the knowledge base 272.

NLU systems have typically operated using a rule based approach where a query processor 293 uses a plurality of rules 298 to process incoming query text to see if the text matches a stored rule. If query text matches the rule, the NLU component 260 would then format a query to the knowledge base 272 and retrieve the answer. One drawback to the rules approach is that queries which are not in the format expected by an NLU rule may result in a system error even if the query calls for the same information as a "properly" formatted query recognizable by a rule. For example, if a rule is configured to recognize a query in the form of "what is the [property] of [entity]" and an incoming query is phrased as "[entity] has what [property]" may result in an error.

To improve system recognition and resolution of differently phrased questions, a multi-stage approach is offered. The system first uses a machine learning trained classifier to obtain a query type/intent of the query. The system then uses a machine learning trained model, trained specifically for the particular query type, to identify text portions corresponding to entities included in the query text. The text portions, query type, and other information may then be used by the formatter 299 to format output data to be sent from the NLU component 260 to the knowledge base 272 to obtain answer data corresponding to the question. Thus, the NLU component 260 needs to identify when the query is requesting certain information, identify what information is being requested, and formulate output data that can be sent to the knowledge base 272 to obtain the right answer.

A query type, sometimes referred to as an intent, is an object of the query, that is, what the query wants to accomplish. As can be appreciated, there are many different kinds of query types, and many different examples of queries within each query type. For example, a query of "what is the capital of France" may be of a first query type (where the type is determining a capital city). A query of "what is the capital of Peru" is a different example of the same first query type (determining a capital city). A query of "who is married to Barack Obama" is of a second query type (where the type is determining a spouse) and a query of "who is married to Tom Cruise" is another example of the second query type. A query type may thus be considered as a class of questions that have the same (or similar) structure and related semantics. For example, all questions about for the capital of a country belong to the same one intent. Thus questions that get translated with a same input translation template, and filled with the same set of relations, may be considered a question type.

Current NLU systems attempt to identify, using rules, not only the query type but also the entities needed to answer the query (e.g., France, Peru, Barack Obama, Tom Cruise). By dividing the tasks of (1) identifying the query type and (2) identifying the entities needed to answer the query, the present NLU system may achieve improved performance.

The present system uses machine learning trained models for each task, where the models for entity identification are query type specific. The trained models may be trained using a plurality of previously processed and annotated questions, as answered by the knowledge base 272 or other NLU system. Further, as described below the present system uses distinct features determined from incoming query text to allow for more robust performance of the NLU system.

Figure 3A:
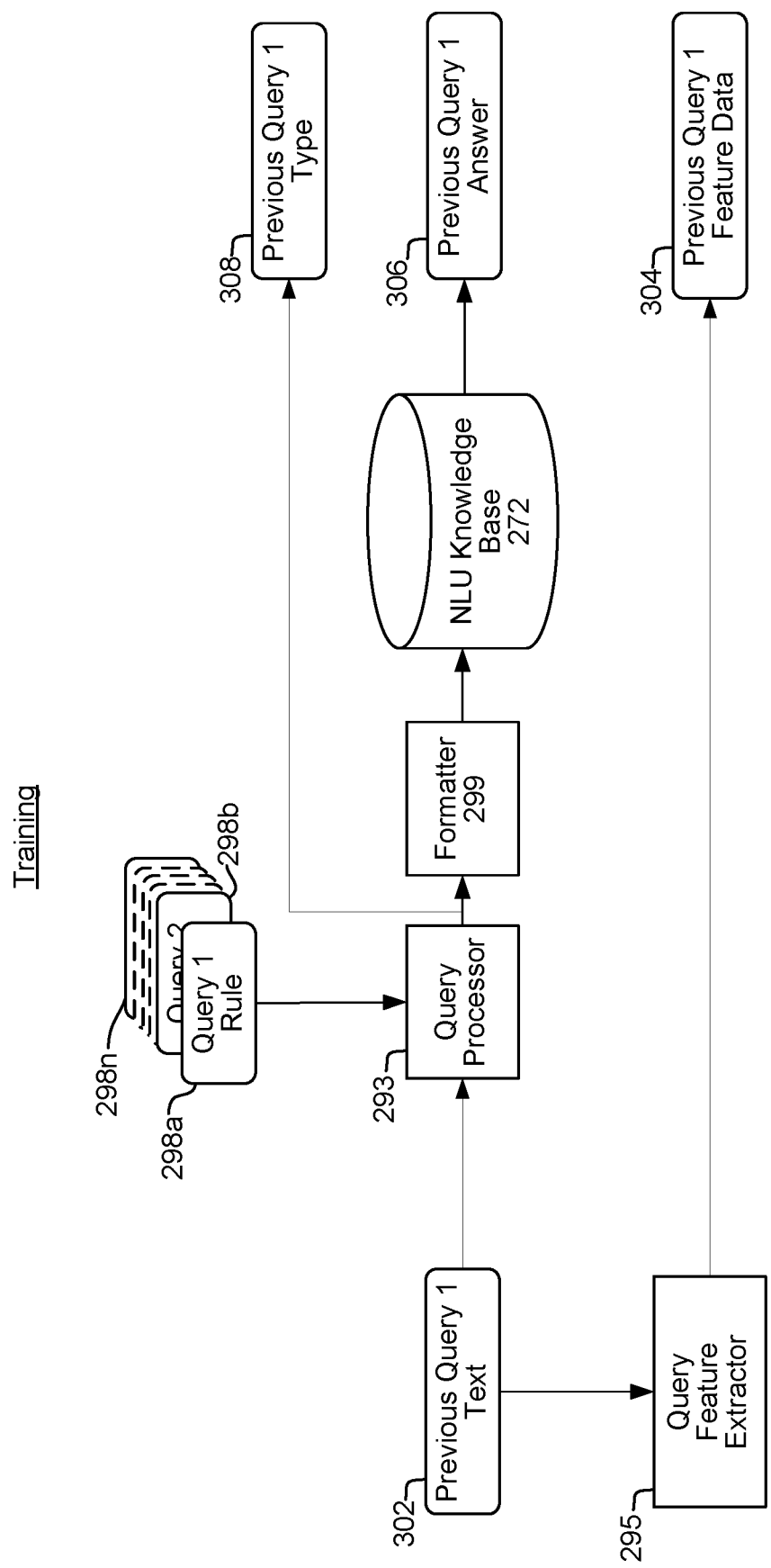

Training of the models is discussed below in reference to FIGS. 3A-3C. The universe of training data may include a plurality of queries answered by the system, along with various data/features associated with each previous query. For example, as shown in FIG. 3A, text 302 of first previous query (called Previous Query 1) may be fed to a query feature extractor 295. The particular feature types extracted during training are the same as the particular feature types extracted during runtime, and are discussed in more detail below. The previous query text 302 is sent to the query processor 293, which uses query rules 298 to determine a semantic interpretation of the Previous Query 1. Using the query rules 298, the query processor 293 may output the query type as well as a mapping of the previous query text 302 to entities named in the input query text, as determined by the query processor 293 using the previous query text 302 and the rules 298. The semantic interpretation is then formatted by the formatter 299 in a form understandable by the knowledge base 272. The semantic interpretation may also include a type 308 of the previous query. The knowledge base 272 then outputs an answer 306 to the previous query. Thus, for Previous Query 1, the system may know the previous query text 302, feature data 304, answer 306, and type 308. While this data may be system generated, a human operator/annotator may also correct the data during the training phase to ensure correctness of this data, which will form the training data. An annotator may also expand the data that will form the training data. For example, other sources of data such as web sources, public data, or other available data corpa may be processed for additional data that can be used to train the various models described herein. such information may be incorporated as additional previous query data 30.

As shown in FIG. 3B, the previous query text 302, feature data 304, answer 306, and type 308 may be considered Previous Query 1 data 310a. The process of 3A may then be performed for many (e.g., thousands to millions of) previous queries to obtain a robust universe of previous query data for training purposes. The data 310a-310n for the plurality of previous queries may be stored in an overall training corpus 320. A model training component 970 may be used to train one or more query type classifiers 291. The query type classifier 291 is trained to determine a query type associated with an incoming query based on one or more of text of an input query and/or the feature values for the input query.

During training, the query type for each previous query is known. Thus, the data in the overall training corpus 320 may be divided by which previous queries belong to which query type. As illustrated in FIG. 3C, multiple type-sorted training corpora 330 may be configured. These may be actual separate stores of data or merely filtered data from the overall training corpus 320. As illustrated, each type-specific training corpus will include only data related to previous queries of the particular query type. For example, type 1 training corpus 330-1 will include data 340-1 for previous queries of type 1 (e.g., determining a capital city), type 2 training corpus 330-2 will include data 340-2 for previous queries of type 2 (e.g., determining a spouse), and so on for all the different query types.

The system, through model training component(s) 970 may then train query type specific models 292 (which themselves may also be classifiers). The query type specific models are configured to identify, in query text (of the particular query type), text portion(s) corresponding to entities to be used in resolving the query. As can be appreciated, each query type model is trained on data related to that specific query and is configured to identify entity text portion(s) for that type of query. For example, query type 1 model 292a is trained using data 340-1 from previous queries of type 1. Query type 1 model 292a is also configured to identify text portions corresponding to entities needed to answer queries of type 1. For example, if query type 1 is determining a capital city, query type 1 model 292a would be configured to recognize, using the incoming query text (and features based on that incoming query text) the country, state, or other geographic entity whose capital is being sought. As the training data 340-1 may include many different formulations and ways of asking for a capital city, the model 292a may be robust in identifying text corresponding to the entity needed to find the capital city.

Other query type models are trained on data from previous queries related to the specific query type. That is query type 2 model 292b is trained using data 340-2 from previous queries of type 2, and so forth. Thus, each query type model 292 is configured to identify text portion(s) for entity(ies) of its respective specific query type. This process for identifying the text portions (also known as "slots") corresponding to entities may be referred to as "tagging" the slots and the models 292 may be referred to as taggers. A slot may be considered as a value that vary between different queries that are part of the same query type/intent.

The data used to train the query type classifier 291 may be different from the data used to train the slot tagging models 292. Thus, the previous query 1 data 310a in corpus 320 may include a number of different data points (corresponding to a certain set of features) about previous query 1 to be used in training classifier 291, the previous queries of type X data 340-x may include other types of data points (corresponding to a different set of features) about the previous queries of type X. Similarly, at runtime, the types of data considered by the type classification/IC module 264 using the classifier 291 may be different from the types of data considered by the entity tagger 268 using the particular query type model 292. The same query feature extractor 295 may be configured to extract the feature data needed by both processes (query type determining or entity tagging) or separate feature extractors may be configured, one for features used for query type classification, another for entity tagging.

As can be appreciated, the customized models for slot tagging may result in improved performance over generalized tagging (i.e., using one model or approach to identify slots without knowing a priori the query type). One reason for this is that each particular query type may have a fixed number of slots for the fixed number of entities needed to resolve the query. For example, a query type of determining a capital city may have only one slot (for the country whose capital city is sought). Similarly, a query type of determining a spouse may also have only one slot (for the other spouse). A query of a different type, for example, "what is the highest mountain in United States" may represent a query type that has three slots, namely "what is the [superlative] [type of entity] in [location]" where the [superlative], [type of entity], and [location] represent different slots. Thus, each particular query type model 292 is configured to identify text portions(s)/slot(s) corresponding to the number of entities of the respective query type of the specific query type model 292.

Although illustrated herein as relating to entities, slots may correspond to any query variable, where a variable is any portion of text whose meaning needs to be determined to resolve (i.e., answer) the query. Thus, the query type model(s) 292 discussed herein may identify text strings/slots corresponding to variable(s) in the query text. Examples of variables include not only named entities (for example, "United States") but also to object classes (for example, "mountain"), superlatives (for example, "highest"), or other categories of data. For illustrative purposes, however, the discussion of the system operation focuses on entity tagging and identifying text strings corresponding to entities, but the same principles apply to any semantic variable.

Various machine learning techniques may be used to perform the training of the classifier(s) 291 and models 292. Models may be trained and operated according to various machine learning techniques. Such techniques may include, for example, inference engines, trained classifiers, etc. Examples of trained classifiers include conditional random fields (CRF) classifiers, Support Vector Machines (SVMs), neural networks (such as deep neural networks and/or recurrent neural networks), decision trees, AdaBoost (short for "Adaptive Boosting") combined with decision trees, and random forests. Focusing on CRF as an example, CRF is a class of statistical models used for structured predictions. In particular, CRFs are a type of discriminative undirected probabilistic graphical models. A CRF can predict a class label for a sample while taking into account contextual information for the sample. CRFs may be used to encode known relationships between observations and construct consistent interpretations. A CRF model may thus be used to label or parse certain sequential data, like query text as described above. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the accuracy of a training set's classification for supervised learning techniques. For example, known types for previous queries (e.g., 308) may be used as ground truth data for the training set used to train classifier 291. Known slots for queries of data type 1 may be used as ground truth for training query type 1 model 292a. Various techniques may be used to train the models including backpropagation, statistical learning, supervised learning, semi-supervised learning, stochastic learning, stochastic gradient descent, or other known techniques. Further, while the training examples discussed above in reference to FIGS. 3A-3C discuss training examples obtained from previous queries of the knowledge base 272, other training data, such as user annotated queries, other queries, etc. may also be used. Thus, many different training examples may be used to train the machine learning classifier(s)/model(s) discussed herein. Further, as training data is added to, or otherwise changed, new classifiers/models may be trained to update the classifiers/models as desired.

A number of different classifiers or machine learning models may be used. For the query type classifier 291, a linear classifier may be used. As a very large number of query types may be considered, multi-class logistic regression (aka maximum entropy), i.e. one-v-all classifiers for query type may be used. Such an arrangement may produce a classification probability, which can be used downstream if desired. For the query type models 292, a conditional random fields (CRF) classifier may be used. A CRF classifier is a classifier known in the art that can take context into account when predicting label for an input. For any given question intent, the job of a CRF would be limited due to the small number of slots to be identified, and because of the limited types of context in which such slots can occur.

As can be appreciated, the feature types used by the system to characterize each previous query during training and each input query at runtime can greatly impact the performance of the system. A number of different feature types may be used by the present system. For example, certain feature(s) may be based on the first few words of a question type as such words may provide a good indication of question type (e.g., what is/who is/etc.). Question length (in words, characters, or otherwise) may also be used as a feature. Other example features that may be used include sequences of parts of text, syntactic structure, word sequence, or the like.

Further, semantic word embeddings for certain words of the query text may be used as features. Word embeddings are representations of particular word usage and may be compared with other word embeddings to identify other words that are used similarly to a subject word as a way of capturing synonymy (potential similar meaning) without necessarily knowing the definition of the words in question.

Figure 4:
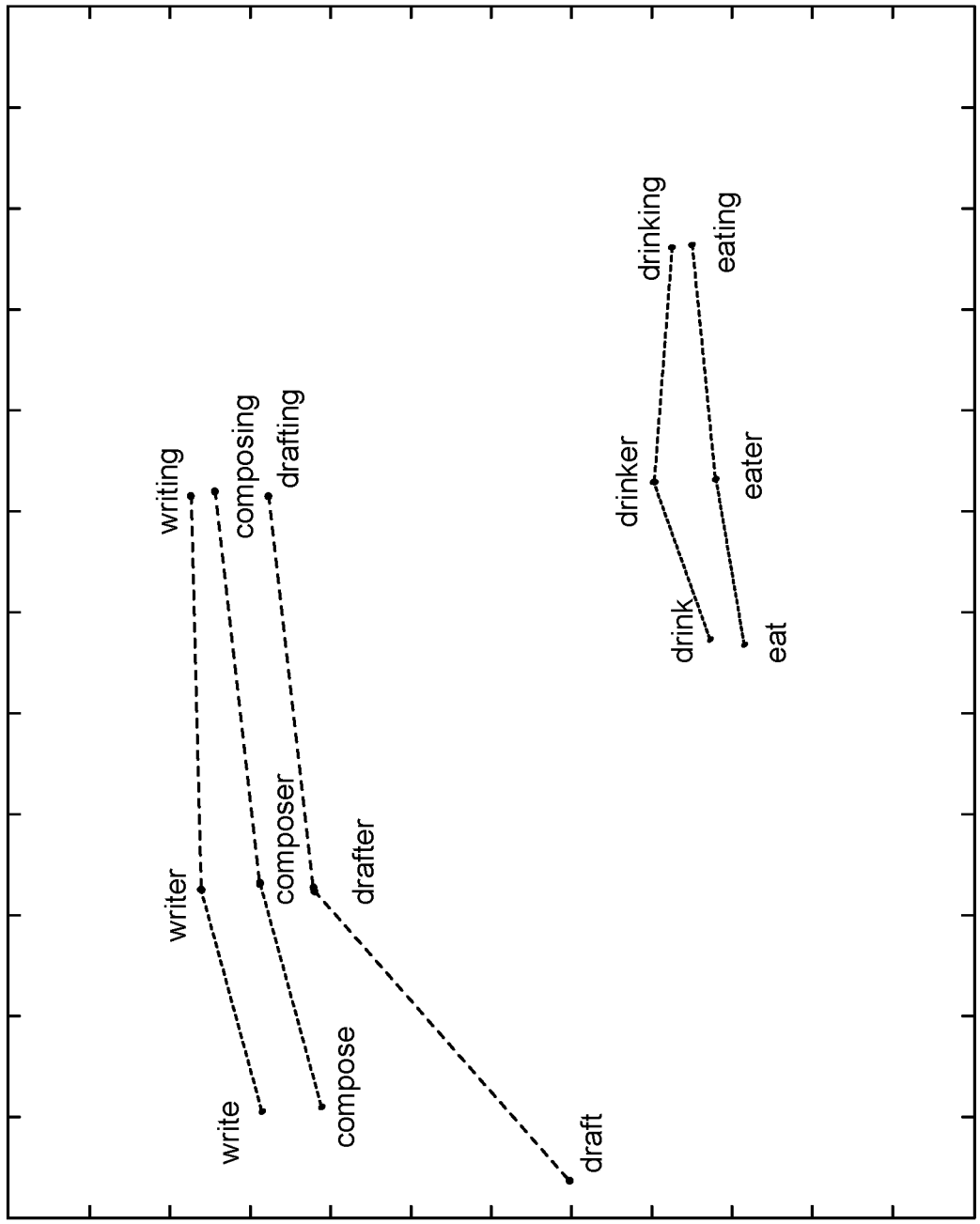
FIG. 4 illustrates representations of word usage similarity in a vector space according to embodiments of the present disclosure.

FIG. 4 illustrates an example of representing word embeddings in a vector space. Such a representation may be useful for showing the relationship between usage of individual words, as well as showing the relationship between usage of variations of a particular word and showing the relationship between the same usage variation across different word roots. Thus, a vector space may be used to represent semantic relationships between words as geometric relationship between vectors. For example, FIG. 4 illustrates a number of words in a hypothetical vector space where each point represents the vector location for the particular word. Each vector is made up of data points regarding a use of the particular word in some textual corpus. Sample data points in the vector may include location the word is used in a sentence, other words the word is used nearby, etc. Although illustrated as located in a two-dimensional graph for discussion purposes, the usage vectors for the words illustrated in FIG. 4 would be in a high dimensional space. Further, FIG. 4 is shown for example purposes only and the vector locations/relationships do not necessarily reflect a true graphing of the usage of the illustrated words.

As illustrated in FIG. 4, certain words that have similar semantic meaning may be close to each other in the vector space (indicating a similarity of usage characteristics). Also, certain words that have different semantic meanings may also be close to each other in the vector space (also indicating a similarity of usage characteristics). In the top portion of the illustration, words "writer," "composer" and "drafter" are located near each other, indicating that those three words are used similarly in the word data used to generate the vectors of FIG. 4. Similarly, the words "writing," "composing" and "drafting" are also located near each other, also indicating that those three words are used similarly. The words "write," "compose," and "draft" are not as close in the illustration, with "draft" in particular being located farther away from "write" and "compose" than those words are to each other. This distance may be due to other uses of the word "draft" that may differ from "write" and "compose," for example, "draft" has a known noun form, where the "write" and "compose" do not and "draft" may also have other semantic meanings (such as a cold interior breeze) that differ from "write" and "compose."

Further, the variations of the words (save for "draft") have similar usage relationships relative to each other. For example, the usage relationships of "write" to "writer" to "writing" is similar to the usage relationship between "compose" to "composer" to "composing" as shown by the lines connecting those triplets of words. Other, non-illustrated variations may also exist (such as "writes," "drafted," etc.) with their own vectors and usage relationships to other words.

Words in the bottom corner of FIG. 4 exhibit similar relationships to each other as the words discussed above. The words "drink" and "eat" have different semantic meanings, but similar usages as illustrated. Further, the usage relationships of "drink" to "drinker" to "drinking" are similar to the relationships of "eat" to "eater" to "eating." Also, "drink" shows a similar usage to "eat," "drinker" shows a similar usage to "eater" and "drinking" shows a similar usage to "eating." As "eat," "eater," and "eating" are all variations of a first word root, and "drink," "drinker," and "drinking" are all variations of a second word root, the system may use the usage relationships of these words to create new variations of another new word that shares usage with one of the variation forms. Thus, if a vector corresponding to a new word is within a threshold distance to "eat" and/or "drink" the system may determine that the new word is used similarly to "eat" and/or "drink." Various known techniques, such as Cosine distance, Euclidean distance, Manhattan distance or other techniques may be used for determining a difference between word usage, or word usage vectors. Known techniques such as using a Levenshtein distance may be used for determining a difference between text strings.

Certain features may also be based on other data, represented by gazetteers. An entity gazetteer may be used to indicate a relationship between a specific text string and a known entity (in the knowledge base 272 or otherwise). For example the text word "Paris" may have a known association with the entity of the city Paris, France as well as a known association with the entity the person Paris Hilton. Entity gazetteer information may also be considered as part of feature data described herein. Entity gazetteer information may be filtered or weighted using frequency data or other information from previous queries.

Certain features may also be based on different sections of the query text. In one example, a pyramid feature arrangement may be used where certain feature values are determined based on portions of one size, then other feature values are determined based on portions of a larger size, and so on, resulting in features (such as semantic embeddings) for each segment of the query text. For example, quarter-sized portions may be used where each quarter of the utterance is represented by certain feature data values, then each half is represented by other feature data values, then the whole utterance is represented by still other feature data values. For purposes of determining pyramid-type features, the query text may be divided in a number of ways for example by words (where the number of words of the text is determined and then portions are determined based on number of words in each portion), by characters (where the number of characters of the text is determined and then portions are determined based on number of characters in each portion), by certain types of words (for example, only words that impact query resolution are counted for purposes of determining portions) or in a number of other possible ways.

Figure 5:
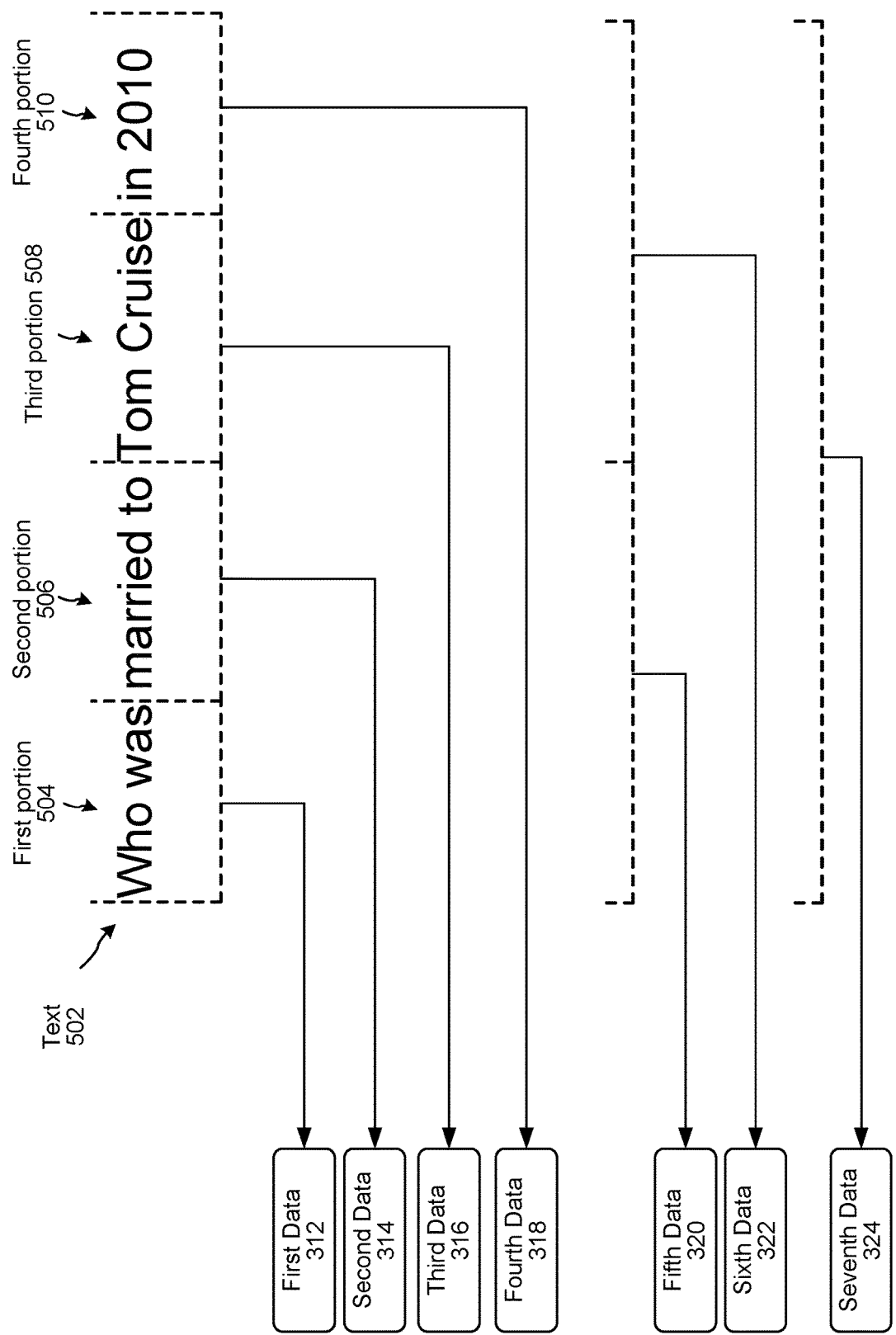
FIG. 5 illustrates an example of obtaining pyramid feature data from query text according to embodiments of the present disclosure.

An example of dividing query text by number of words for purposes of determining pyramid features is shown in FIG. 5. As shown, query text 502 consists of "Who was married to Tom Cruise in 2010." The system may divide the query text 502 into four portions, a first portion 504 "Who was," a second portion 506 "married to," a third portion "Tom Cruise," and a fourth portion 510 "in 2010." The system may determine first data 312 corresponding to first portion 504. The first data 312 may be feature values that describe the contents of the first portion. Such features may include, for example, how many words in the first portion, which words are included, word embedding(s) of those words, position in the query, etc. The system may also determine second data 314 describing the contents of the second portion 506, determine third data 316 describing the contents of the third portion 508 and determine fourth data 318 describing the contents of the fourth portion 510. Continuing in the pyramid fashion, the system may also determine fifth data 320 describing the contents of the first half of the query text (i.e., the first portion 504 and second portion 506) and sixth data 322 describing the contents of the second half of the query text (i.e., the third portion 508 and fourth portion 510). The system may also determine seventh data 324 describing the contents of the entire query text (i.e., the first portion 504, second portion 506, third portion 508, and fourth portion 510). In this manner the system will have data related to features of different portions of the query text that can be operated on to determine the query type/entity text of the utterance. The particular features considered to create the various data portions may be configurable and may be similar to the features considered by the query type or entity tagging processes discussed herein. The pyramid arrangement will allow the system to be more flexible and robust to different query configurations, such as queries that appear in an unusual or out-of-order phrasing. Although FIG. 5 illustrates dividing query text into four portions, the query text may be divided into any number of portions to create portions for pyramid feature as described above.

Other feature types beyond those discussed above may also be used. As can be appreciated, features used during runtime may correspond to features used during training. In this manner the classifier 291 and models 292 will be configured to analyze runtime data that matches the training data, thus enabling accurate results from the models based on data for expected features.

Figure 6:
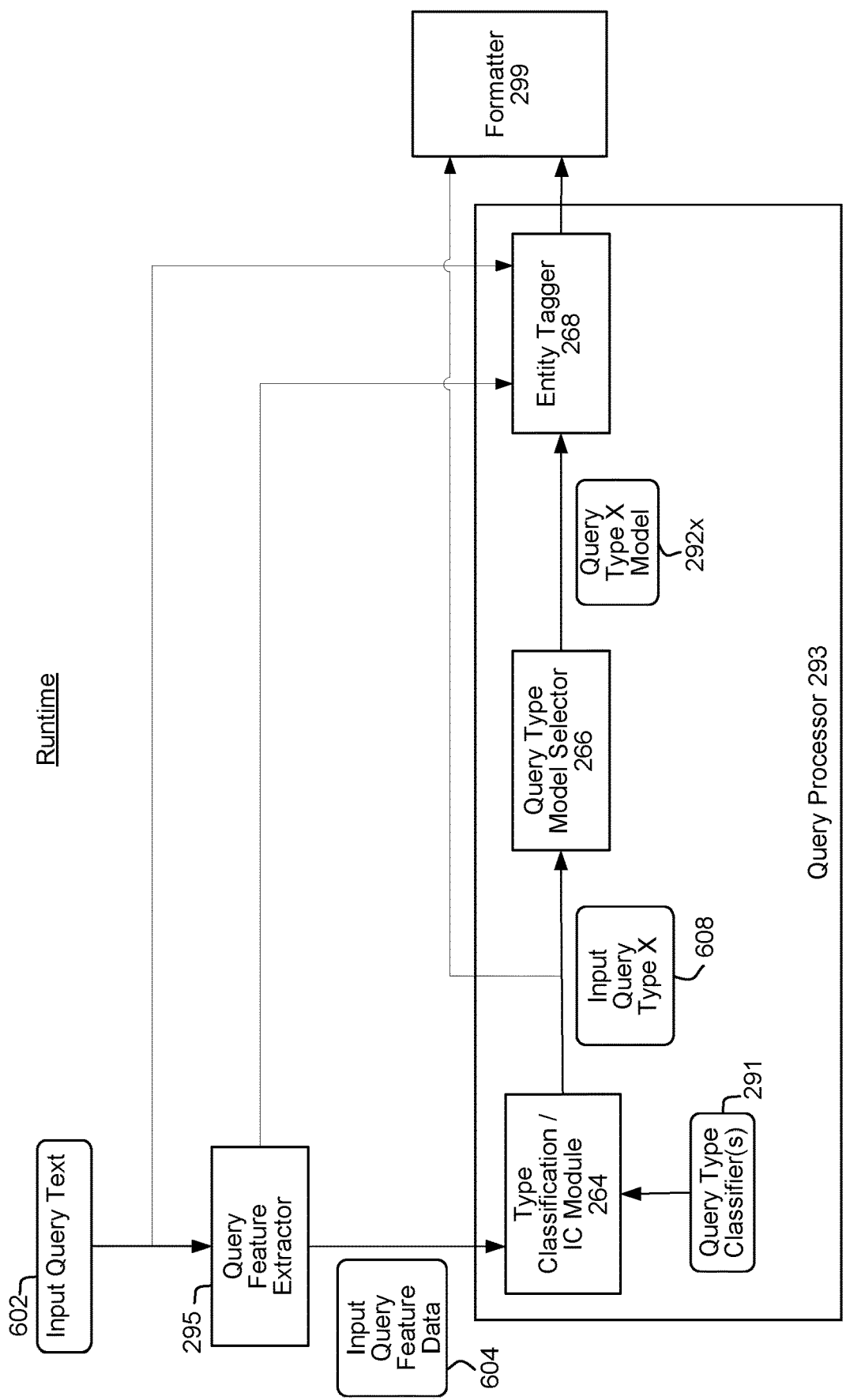
FIG. 6 illustrates components for processing query text at runtime according to embodiments of the present disclosure.

FIG. 6 illustrates processing of query text during runtime. After input query text 602 is received (either through text input or corresponding to a spoken utterance that is converted into text after ASR processing), the query text is passed to the query feature extractor 295 that outputs input query feature data 604. The input query feature data may include a feature vector representing characteristics of the input query text. The input query feature data 604 (and possibly the input query text 602) is input into the type classification/IC module 264. The type classification/IC module 264 uses the query type classifier(s) 291 (or other model trained to identify the query type) to process the input query feature data 604 (such as the feature vector representing the input query text) and/or the input query text 602 itself to determine the input query type, such as the information being sought by the input query. The type classification/IC module 264 then outputs an indication 608 of the determined query type to a query type model selector 266. The output indication may include an identity of the determined query type. For example, the indication 608 may simply be an identification number corresponding to the determined query type. The output indication may also include a score associated with one or more query types. For example, processing by the query type classifier 291 may result in a first score associated with a first query type, a second score associated with a second query type, etc. The scores and respective query types may be passed to the query type model selector 266. The query type model selector 266 selects the particular query type model $292x$ from the plurality of preconfigured models 292a-292n that are configured to identify entity text in queries of the specific type for which each respective model is trained. An entity tagging component 268 then uses the selected query type model 292x along with the input query feature data 604 and input query text 602 to identify the text portion(s) in the input query text 602 that correspond to entity(ies).

As noted above, each query type may be associated with a fixed number of entity slots. That fixed number may be zero, which means the particular query type may not involve any slots. For example, queries such as "tell me a joke" or "is it light outside" may involve no entities, and thus no slots. For such queries, the entity tagger 268 may be skipped, and the query text 602 (or just the indicator of input query type 608) may be passed to the formatter 299, or to another downstream components, such as command processor 290, for execution.

The entity tagger 268, using the query type model 292x, only determines the text portions (i.e., slots) related to the entity. The entity tagger 268 does not perform NER to identify the entity (i.e., link the text portion to an entity in the knowledge base 272) or otherwise associated the determine text portion with an actual entity. Further the entity tagger 268 is not specialized, in that a different entity tagger is used to tag city names, a different entity tagger is used to identify person names, etc. While specific entity types may be expected in different query types, each query type model 292 is configured to identify text corresponding to whatever entity types are expected in the particular query type. Thus, the entity tagger 268 does little more than identify text portions in the input query text 602 corresponding to entities. The entity tagger 268 simply outputs the text of the text portion(s) determined to correspond to the entity(ies). For example, for a query "what is the capital of France" the output of the entity tagger 268 (using the appropriately configured model 292 for the capital query type) would be the text string "France." For the query "how is Tom Cruise related to Nicole Kidman" the output of the entity tagger 268 (using the appropriately configured model 292 for the related to query type) would be the text strings "Tom Cruise" and "Nicole Kidman."

The text output of the entity tagger 268 (along with potentially an indication 608 of the input query type) may be sent to the formatter 299. The formatter 299 may configure output data based on the destination knowledge base 272. That is, the formatter 299 takes the text string(s) output by the entity tagger 268 and the indication 608 of the input query type (along with other possible input data) and formulates a communication to the knowledge base 272, in a format understandable to the knowledge base, that will result in the knowledge base 272 returning the desired answer data. The format understandable to the knowledge base may be a structured semantic query format, that lays out the user's query in a particular manner in which entities and relationships are represented in a structured way understandable by the knowledge base. For example, a capital query may be formatted as the structured semantic query:

query b
[current time] [applies to] now/1
f: b [is the capital of] [france]
f [applies at timepoint] now In another example, a query about the relationship between Tom Cruise and Nicole Kidman may be formatted as the structured semantic query;

query ans
ans [is a description of the kin relationship between]
[group: [tom cruise]; [nicole kidman]]/1

The NLU component 260 may then send the output data to the knowledge base 272, and then receive answer data from the knowledge base 272. If a voice-controlled or other speech interface is involved, the system may then take the answer data and, using text-to-speech (TTS) techniques, synthesize audio speech data corresponding to the answer data. The system may then send the speech data to the user device 110 for playback to the user.

Alternatively, instead of configuring the output data for the knowledge base 272, the formatter 299 may instead reformulate a new query using the output from the entity tagger 268 and indication 608 of query type. The new query may be in a form (such as a canonical form) easily parsed and understood by the query processor 293 using the pre-established query rules 298. This may result in a "paraphrasing" of the original input query into a form more easily processed by the NLU component 260. For example a first query in the form of "Um, can you tell me please, what is France's capital?" or a second query in the form of "Just give me France's darn capital!", either of which may result in an error if processed by a rules based system, each may be processed into a canonical form of "What is the capital of France?", which may be more easily processed by the rules based system. The query processor 293 may then use the query rules 298 to parse the new paraphrased query into identified entities, etc. in a form understandable to the knowledge base 272 (or other downstream component).

In a certain embodiment, the query processor 293 may process incoming query text using both the query rules 298 and the classifier 29/models 292 substantially in parallel to determine which approach yields a correct answer. The NLU component 260 may then select the resulting output data of the approach that is most likely to be correct. For example, if a confidence of a rules-based answer is higher than a confidence of a classifier/model based answer, the former may be selected. Alternatively, the system may decide to select the rule-based answer if one is found, or the system may use some other method to select the final answer.

Figure 7:
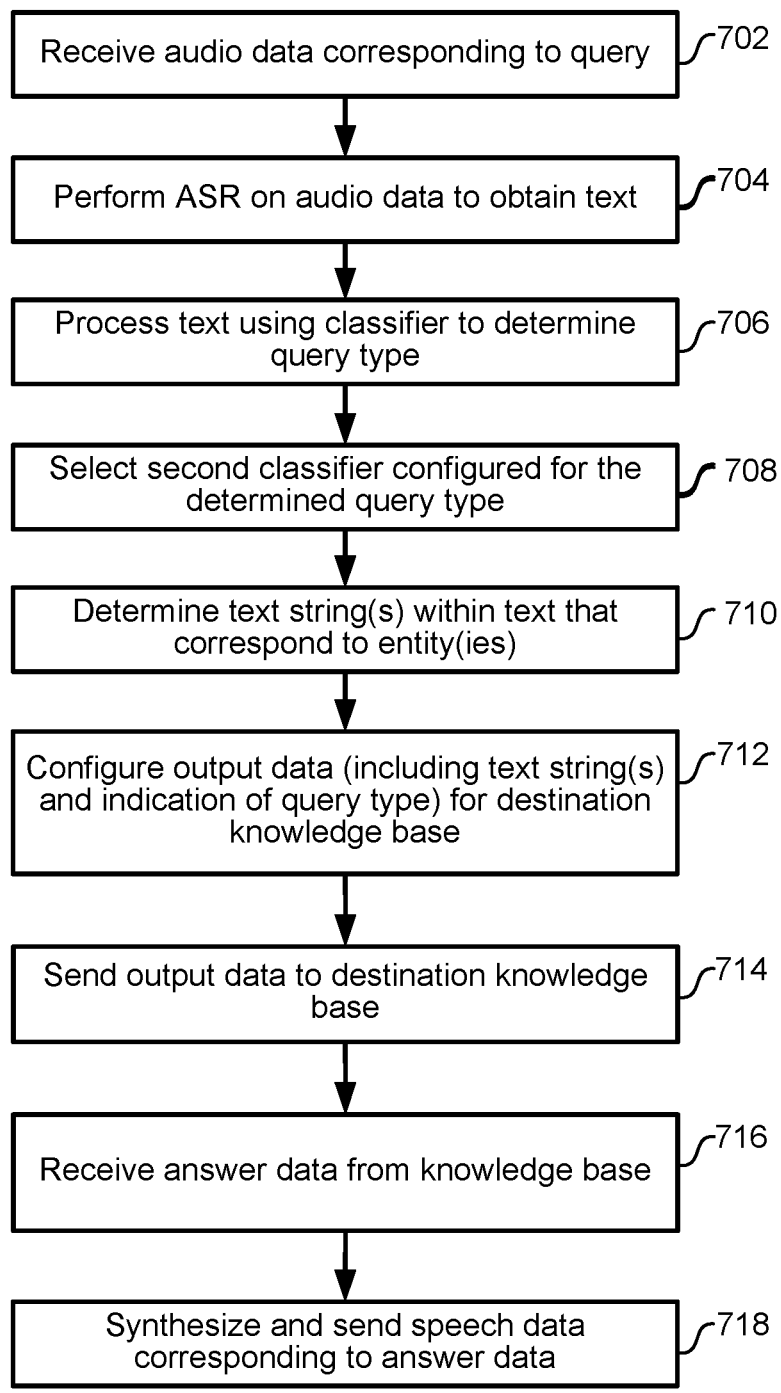
FIG. 7 is a flow chart illustrating processing query text at runtime according to embodiments of the present disclosure.

FIG. 7 is a flow chart illustrating processing query text at runtime according to embodiments of the present disclosure. As illustrated, the system may receive (702) audio data corresponding to a query. The system may perform (704) ASR on the audio data to obtain text. The system may process (706) the text using a classifier to determine the query type. The system may select (708) a second classifier configured for the determined query type. The system may then, using the second classifier, determine (710) text string(s) within the text that correspond to entity(ies) represented in the text. The system may then configure (712) output data (including the text string(s) and indication of query type) for a destination knowledge base. The system may then send (714) the output data to the destination knowledge base and receive (716) answer data from the knowledge base. The system may then synthesize and send (718) speech data corresponding to the answer data to a receiving device (which may be the same device from which the audio data in step 702 was received).

Figure 8:
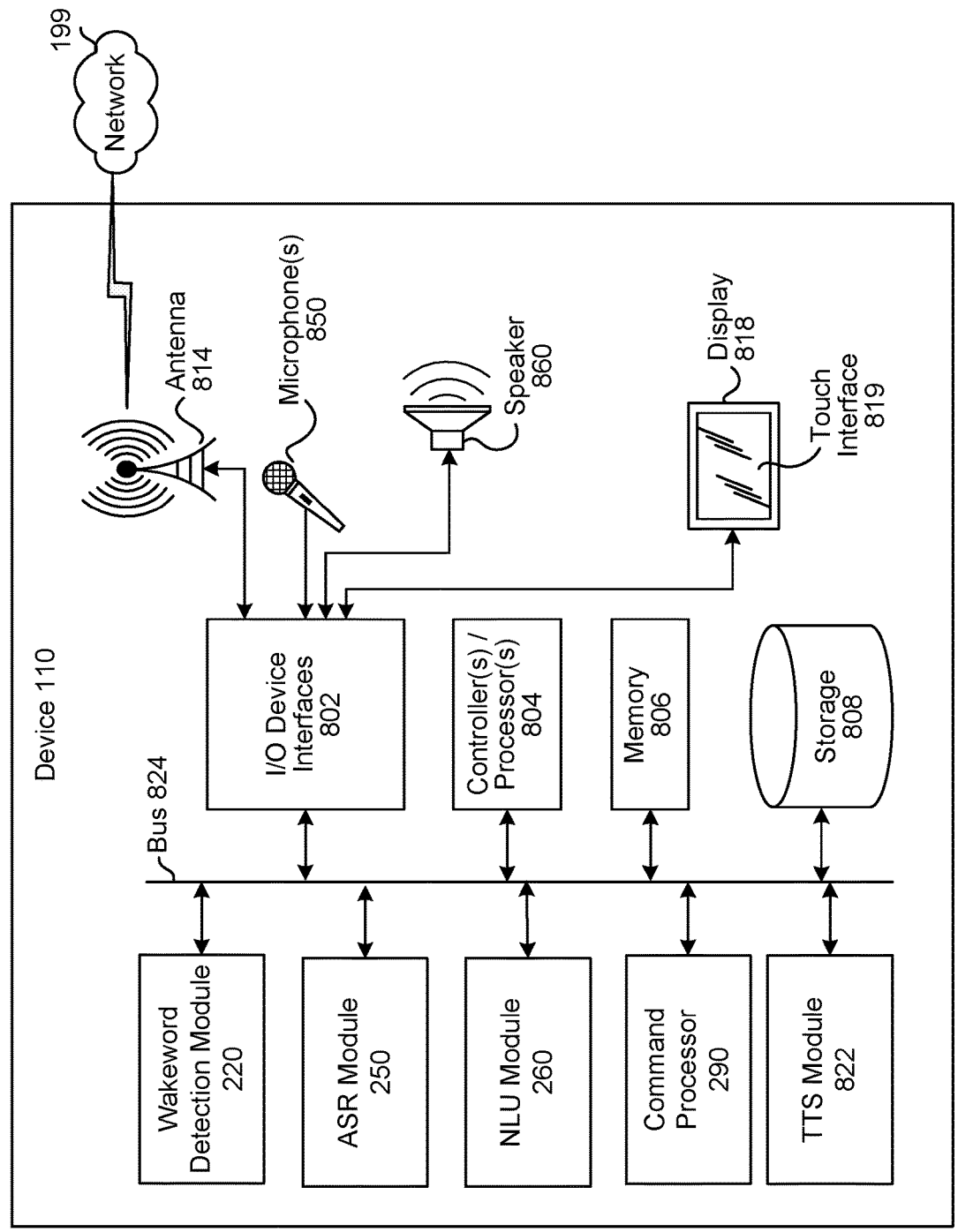
FIG. 8 is a block diagram conceptually illustrating example components of a device according to embodiments of the present disclosure.
Figure 9:
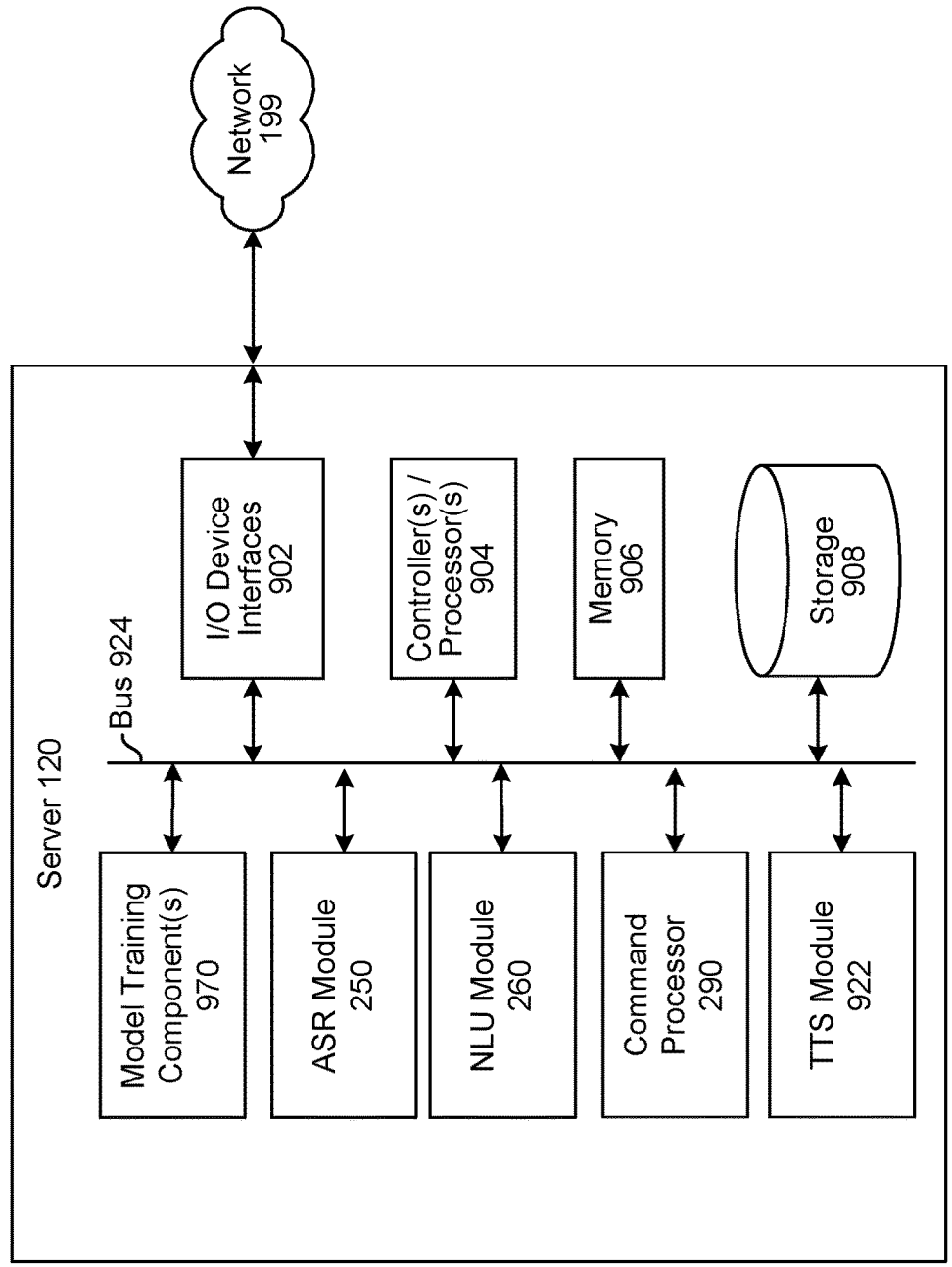
FIG. 9 is a block diagram conceptually illustrating example components of a server according to embodiments of the present disclosure.

FIG. 8 is a block diagram conceptually illustrating a local device 110 that may be used with the described system. FIG. 9 is a block diagram conceptually illustrating example components of a remote device, such as a remote server 120 that may assist with ASR, NLU processing, or command processing. Multiple such servers 120 may be included in the system, such as one server(s) 120 for training ASR models, one server(s) for performing ASR, one server(s) 120 for performing NLU, etc. In operation, each of these devices (or groups of devices) may include computer-readable and computer-executable instructions that reside on the respective device (110/120), as will be discussed further below.

Each of these devices (110/120) may include one or more controllers/processors (804/904), that may each include a central processing unit (CPU) for processing data and computer-readable instructions, and a memory (806/906) for storing data and instructions of the respective device. The memories (806/906) may individually include volatile random access memory (RAM), non-volatile read only memory (ROM), non-volatile magnetoresistive (MRAM) and/or other types of memory. Each device may also include a data storage component (808/908), for storing data and controller/processor-executable instructions. Each data storage component may individually include one or more non-volatile storage types such as magnetic storage, optical storage, solid-state storage, etc. Each device may also be connected to removable or external non-volatile memory and/or storage (such as a removable memory card, memory key drive, networked storage, etc.) through respective input/output device interfaces (802/902).

Computer instructions for operating each device (110/120) and its various components may be executed by the respective device's controller(s)/processor(s) (804/904), using the memory (806/906) as temporary "working" storage at runtime. A device's computer instructions may be stored in a non-transitory manner in non-volatile memory (806/906), storage (808/908), or an external device(s). Alternatively, some or all of the executable instructions may be embedded in hardware or firmware on the respective device in addition to or instead of software.

Each device (110/120) includes input/output device interfaces (802/902). A variety of components may be connected through the input/output device interfaces, as will be discussed further below. Additionally, each device (110/120) may include an address/data bus (824/924) for conveying data among components of the respective device. Each component within a device (110/120) may also be directly connected to other components in addition to (or instead of) being connected to other components across the bus (824/924).

Referring to the device 110 of FIG. 8, the device 110 may include a display 818, which may comprise a touch interface 819. Or the device 110 may be "headless" and may primarily rely on spoken commands for input. As a way of indicating to a user that a connection between another device has been opened, the device 110 may be configured with a visual indicator, such as an LED or similar component (not illustrated), that may change color, flash, or otherwise provide visual indications by the device 110. The device 110 may also include input/output device interfaces 802 that connect to a variety of components such as an audio output component such as a speaker 860, a wired headset or a wireless headset (not illustrated) or other component capable of outputting audio. The device 110 may also include an audio capture component. The audio capture component may be, for example, a microphone 850 or array of microphones, a wired headset or a wireless headset (not illustrated), etc. The microphone 850 may be configured to capture audio. If an array of microphones is included, approximate distance to a sound's point of origin may be performed acoustic localization based on time and amplitude differences between sounds captured by different microphones of the array. The device 110 (using microphone 850, wakeword detection module 220, ASR module 250, etc.) may be configured to determine audio data corresponding to detected audio data. The device 110 (using input/output device interfaces 802, antenna 814, etc.) may also be configured to transmit the audio data to server 120 for further processing or to process the data using internal components such as a wakeword detection module 220.

For example, via the antenna(s), the input/output device interfaces 802 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc. A wired connection such as Ethernet may also be supported. Through the network(s) 199, the speech processing system may be distributed across a networked environment.

The device 110 and/or server 120 may include an ASR module 250. The ASR module in device 110 may be of limited or extended capabilities. The ASR module 250 may include the language models 254 stored in ASR model storage component 252, and an ASR module 250 that performs the automatic speech recognition process. If limited speech recognition is included, the ASR module 250 may be configured to identify a limited number of words, such as keywords detected by the device, whereas extended speech recognition may be configured to recognize a much larger range of words.

The device 110 and/or server 120 may include a limited or extended NLU module 260. The NLU module in device 110 may be of limited or extended capabilities. The NLU module 260 may comprising the named entity recognition module 262, the intent classification module 264 and/or other components. The NLU module 260 may also include a stored knowledge base and/or entity library, or those storages may be separately located.

The device 110 and/or server 120 may also include a command processor 290 that is configured to execute commands/functions associated with a spoken command as described above.

The device 110 may include a wakeword detection module 220, which may be a separate component or may be included in an ASR module 250. The wakeword detection module 220 receives audio signals and detects occurrences of a particular expression (such as a configured keyword) in the audio. This may include detecting a change in frequencies over a specific period of time where the change in frequencies results in a specific audio signature that the system recognizes as corresponding to the keyword. Keyword detection may include analyzing individual directional audio signals, such as those processed post-beamforming if applicable. Other techniques known in the art of keyword detection (also known as keyword spotting) may also be used. In some embodiments, the device 110 may be configured collectively to identify a set of the directional audio signals in which the wake expression is detected or in which the wake expression is likely to have occurred.

The wakeword detection module 220 receives captured audio and processes the audio (for example, using model(s) 232) to determine whether the audio corresponds to particular keywords recognizable by the device 110 and/or system 100. The storage 808 may store data relating to keywords and functions to enable the wakeword detection module 220 to perform the algorithms and methods described above. The locally stored speech models may be pre-configured based on known information, prior to the device 110 being configured to access the network by the user. For example, the models may be language and/or accent specific to a region where the user device is shipped or predicted to be located, or to the user himself/herself, based on a user profile, etc. In an aspect, the models may be pre-trained using speech or audio data of the user from another device. For example, the user may own another user device that the user operates via spoken commands, and this speech data may be associated with a user profile. The speech data from the other user device may then be leveraged and used to train the locally stored speech models of the device 110 prior to the user device 110 being delivered to the user or configured to access the network by the user. The wakeword detection module 220 may access the storage 808 and compare the captured audio to the stored models and audio sequences using audio comparison, pattern recognition, keyword spotting, audio signature, and/or other audio processing techniques.

To create output speech, the system 100 may be configured with a text-to-speech ("TTS") module (822/922) that transforms input text data (for example the text from command processor 290) into audio data representing speech. The audio data may then be sent to the device (110) for playback to the user, thus creating the output speech. The TTS module (822/922) may include a TTS storage for converting the input text into speech. The TTS module (822/922) may include its own controller(s)/processor(s) and memory or may use the controller/processor and memory of the server(s) 120 or other device, for example. Similarly, the instructions for operating the TTS module (822/922) may be located within the TTS module (822/922), within the memory and/or storage of the server(s) 120, or within an external device.

Text input into a TTS module (822/922) may be processed to perform text normalization, linguistic analysis, and linguistic prosody generation. During text normalization, the TTS module (822/922) processes the text input and generates standard text, converting such things as numbers, abbreviations (such as Apt., St., etc.), and symbols ($, %, etc.) into the equivalent of written out words.

During linguistic analysis the TTS module (822/922) analyzes the language in the normalized text to generate a sequence of phonetic units corresponding to the input text. This process may be referred to as phonetic transcription. Phonetic units include symbolic representations of sound units to be eventually combined and output by the system 100 as speech. Various sound units may be used for dividing text for purposes of speech synthesis. The TTS module (822/922) may process speech based on phonemes (individual sounds), half-phonemes, di-phones (the last half of one phoneme coupled with the first half of the adjacent phoneme), bi-phones (two consecutive phonemes), syllables, words, phrases, sentences, or other units. Each word may be mapped to one or more phonetic units. Such mapping may be performed using a language dictionary stored by the system 100, for example in the TTS storage. The linguistic analysis performed by the TTS module (822/922) may also identify different grammatical components such as prefixes, suffixes, phrases, punctuation, syntactic boundaries, or the like. Such grammatical components may be used by the TTS module (822/922) to craft a natural sounding audio waveform output. The language dictionary may also include letter-to-sound rules and other tools that may be used to pronounce previously unidentified words or letter combinations that may be encountered by the TTS module (822/922). Generally, the more information included in the language dictionary, the higher quality the speech output.

Based on the linguistic analysis, the TTS module (822/922) may then perform linguistic prosody generation where the phonetic units are annotated with desired prosodic characteristics, also called acoustic features, which indicate how the desired phonetic units are to be pronounced in the eventual output speech. During this stage the TTS module (822/922) may consider and incorporate any prosodic annotations that accompanied the text input. Such acoustic features may include pitch, energy, duration, and the like. Application of acoustic features may be based on prosodic models available to the TTS module (822/922). Such prosodic models indicate how specific phonetic units are to be pronounced in certain circumstances. A prosodic model may consider, for example, a phoneme's position in a syllable, a syllable's position in a word, a word's position in a sentence, phrase, or paragraph, neighboring phonetic units, etc. As with the language dictionary, prosodic models with more information may result in higher quality speech output than prosodic models with less information. As can be appreciated, when a larger portion of a textual work is made available to the TTS module (822/922), the TTS module (822/922) may assign more robust and complex prosodic characteristics that vary across the portion, thus making the portion sound more human, resulting in higher quality audio output.

The TTS module (822/922) may generate a symbolic linguistic representation, which may include a sequence of phonetic units annotated with prosodic characteristics. This symbolic linguistic representation may then be converted into an audio waveform of speech for output to an audio output device (such as a microphone) and eventually to a user. The TTS module (822/922) may be configured to convert the input text into high-quality natural-sounding speech in an efficient manner. Such high-quality speech may be configured to sound as much like a human speaker as possible, or may be configured to be understandable to a listener without attempts to mimic a specific human voice.

The TTS module (822/922) may perform speech synthesis using one or more different methods. In one method of synthesis called unit selection, described further below, the TTS module (822/922) matches the symbolic linguistic representation against a database of recorded speech, such as a database of a voice corpus. The TTS module (822/922) matches the symbolic linguistic representation against spoken audio units in the database. Matching units are selected and concatenated together to form a speech output. Each unit includes an audio waveform corresponding with a phonetic unit, such as a short .wav file of the specific sound, along with a description of the various acoustic features associated with the .wav file (such as its pitch, energy, etc.), as well as other information, such as where the phonetic unit appears in a word, sentence, or phrase, the neighboring phonetic units, etc. Using all the information in the unit database, the TTS module (822/922) may match units (for example in a unit database) to the input text to create a natural sounding waveform. The unit database may include multiple examples of phonetic units to provide the system 100 with many different options for concatenating units into speech. One benefit of unit selection is that, depending on the size of the database, a natural sounding speech output may be generated. As described above, the larger the unit database of the voice corpus, the more likely the system will be able to construct natural sounding speech.

In another method of synthesis, called parametric synthesis, parameters such as frequency, volume, and noise are varied by the TTS module (822/922) to create an artificial speech waveform output. Parametric synthesis may use an acoustic model and various statistical techniques to match a symbolic linguistic representation with desired output speech parameters. Parametric synthesis may include the ability to be accurate at high processing speeds, as well as the ability to process speech without large databases associated with unit selection, but also typically produces an output speech quality that may not match that of unit selection. Unit selection and parametric techniques may be performed individually or combined together and/or combined with other synthesis techniques to produce speech audio output.

Parametric speech synthesis may be performed as follows. The TTS module (822/922) may include an acoustic model, or other models, which may convert a symbolic linguistic representation into a synthetic acoustic waveform of the text input based on audio signal manipulation. The acoustic model includes rules that may be used to assign specific audio waveform parameters to input phonetic units and/or prosodic annotations. The rules may be used to calculate a score representing a likelihood that a particular audio output parameter(s) (such as frequency, volume, etc.) corresponds to the portion of the input symbolic linguistic representation.

A number of techniques may be used to match speech to be synthesized with input phonetic units and/or prosodic annotations. One common technique is using Hidden Markov Models (HMMs). HMMs may be used to determine probabilities that audio output should match textual input. HMMs may be used to translate parameters from the linguistic and acoustic space to the parameters to be used by a vocoder (a digital voice encoder) to artificially synthesize the desired speech. Using HMMs, a number of states are presented, in which the states together represent one or more potential acoustic parameters to be output to the vocoder and each state is associated with a model, such as a Gaussian mixture model. Transitions between states may also have an associated probability, representing a likelihood that a current state may be reached from a previous state. Sounds to be output may be represented as paths between states of the HMM and multiple paths may represent multiple possible audio matches for the same input text. Each portion of text may be represented by multiple potential states corresponding to different known pronunciations of phonemes and their parts (such as the phoneme identity, stress, accent, position, etc.). An initial determination of a probability of a potential phoneme may be associated with one state. As new text is processed, the state may change or stay the same, based on the processing of the new text. For example, the pronunciation of a previously processed word might change based on later processed words. A Viterbi algorithm may be used to find the most likely sequence of states based on the processed text. The HMMs may generate speech in parametrized form including parameters such as fundamental frequency ($f_0$), noise envelope, spectral envelope, etc. that are translated by a vocoder into audio segments. The output parameters may be configured for particular vocoders such as a STRAIGHT vocoder, TANDEM-STRAIGHT vocoder, HNM (harmonic plus noise model) based vocoders, CELP (code-excited linear prediction) vocoders, GlottHMM vocoders, HSM (harmonic/stochastic model) vocoders, or others.

The TTS module (822/922) may be configured to perform TTS processing in multiple languages. For each language, the TTS module (822/922) may include specially configured data, instructions, and/or components to synthesize speech in the desired language(s). To improve performance, the TTS module (822/922) may revise/update the contents of the TTS storage based on feedback of the results of TTS processing, thus enabling the TTS module (822/922) to improve TTS processing.

Other information may also be stored in the TTS storage for use in TTS processing. The contents of the TTS storage may be prepared for general TTS use or may be customized to include sounds and words that are likely to be used in a particular application. For example, for TTS processing by a global positioning system (GPS) device, the TTS storage may include customized speech specific to location and navigation. In certain instances the TTS storage may be customized for an individual user based on his/her individualized desired speech output. For example a user may prefer a speech output voice to be a specific gender, have a specific accent, speak at a specific speed, have a distinct emotive quality (e.g., a happy voice to correspond to a happy moment in the literary work), or other customizable characteristic. The TTS module (822/922) may include specialized databases or models to account for user preferences.

For example, to create the customized speech output of the system 100, the system 100 may be configured with multiple voice corpuses/unit databases, where each unit database is configured with a different "voice" to match desired speech qualities. The voice selected by the TTS module (822/922) to synthesize the speech may correspond to a character in the literary work. For example, one voice corpus may be stored to be used to synthesize a 1st male character's speech, another may be stored to be used to synthesize a 1st female's character, and so on. Thus the audio of each customized voice corpus matches the respective desired speech quality. The customized voice corpuses may then be used during runtime to differentiate different characters in the literary work. Additionally, parametric synthesis may be used to synthesize speech with the desired speech quality. For parametric synthesis, parametric features may be configured that match the desired speech quality. The application may also offer a user certain pre-programmed choices of types of sounds that the system 100 may provide.

The server may include a model training component 970. The model training component may be used to train the classifier(s)/models discussed above.

As noted above, multiple devices may be employed in a single speech processing system. In such a multi-device system, each of the devices may include different components for performing different aspects of the speech processing. The multiple devices may include overlapping components. The components of the devices 110 and server 120, as illustrated in FIGS. 8 and 9, are exemplary, and may be located a stand-alone device or may be included, in whole or in part, as a component of a larger device or system.

Figure 10:
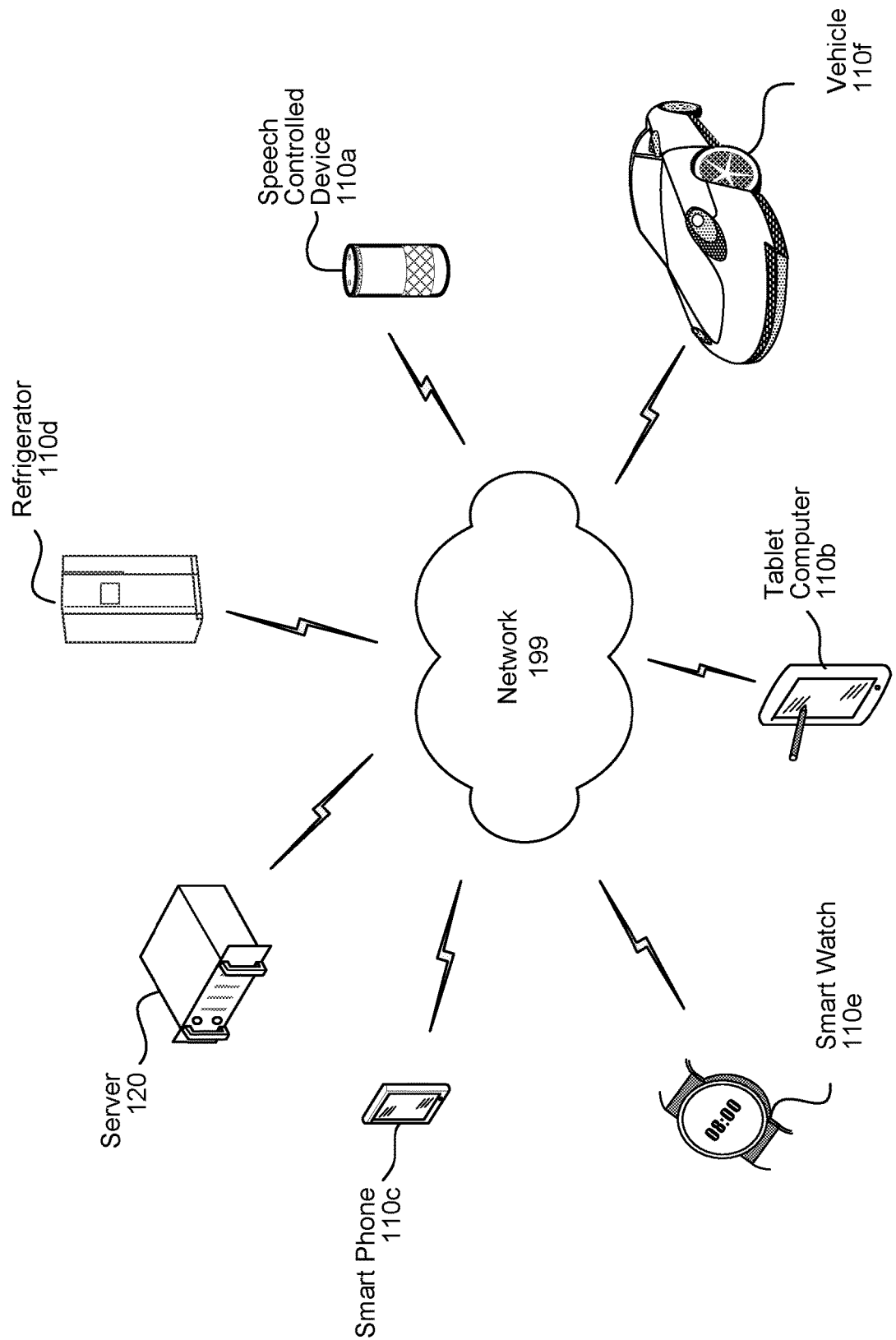
FIG. 10 illustrates an example of a computer network for use with the system.

As illustrated in FIG. 10 multiple devices (120, 120x, 110a to 1100 may contain components of the system 100 and the devices may be connected over a network 199. Network 199 may include a local or private network or may include a wide network such as the internet. Devices may be connected to the network 199 through either wired or wireless connections. For example, a speech controlled device 110a, a tablet computer 110b, a smart phone 110c, a refrigerator 110d, a smart watch 110e, and/or a vehicle 110f may be connected to the network 199 through a wireless service provider, over a WiFi or cellular network connection or the like. Other devices are included as network-connected support devices, such as a server 120, application developer devices 120x, or others. The support devices may connect to the network 199 through a wired connection or wireless connection. Networked devices 110 may capture audio using one-or-more built-in or connected microphones 850 or audio capture devices, with processing performed by ASR, NLU, or other components of the same device or another device connected via network 199, such as an ASR 250, NLU 260, etc. of one or more servers 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage media may be implemented by a volatile computer memory, non-volatile computer memory, hard drive, solid-state memory, flash drive, removable disk and/or other media. In addition, components of one or more of the modules and engines may be implemented as in firmware or hardware, such as the acoustic front end 256, which comprise among other things, analog and/or digital filters (e.g., filters configured as firmware to a digital signal processor (DSP)).

As used in this disclosure, the term "a" or "one" may include one or more items unless specifically stated otherwise. Further, the phrase "based on" is intended to mean "based at least in part on" unless specifically stated otherwise.

What is claimed is:

1. A computer implemented method comprising:
   receiving text corresponding to a user query;
   determining a feature vector by:
      dividing the text into a first portion and a second portion,
      determining first data describing characteristics of the first portion,
      determining second data describing characteristics of the second portion,
      determining third data describing characteristics of an entirety of the text, and
      incorporating the first data, the second data, and the third data into the feature vector;
   processing the feature vector and the text using a first classifier to determine intent data corresponding to the user query, the intent data representing a first intent and a first score that the text is associated with the first intent, the intent data further representing a second intent and a second score that the text is associated with the second intent, wherein the first score is higher than the second score;
   identifying a plurality of classifiers comprising:
      a second classifier to perform entity tagging for a query corresponding to the first intent by identifying a portion of the query representing a first entity type associated with the first intent, and
      a third classifier to perform entity tagging for a query corresponding to the second intent by identifying a portion of the query representing a second entity type;
   processing the intent data to select the second classifier based at least in part on determining that the second classifier is associated with the first intent and the third classifier is associated with the second intent;
   processing the feature vector using the second classifier to identify a first portion of the text, the first portion representing the first entity type;
   performing entity resolution using the first portion and the first intent to determine second data corresponding to the first entity type;
   sending, to a knowledge base, at least the first intent and the first data to enable the knowledge base to determine an answer to the user query; and
   receiving, from the knowledge base, answer data responsive to the user query.

2. The computer implemented method of claim 1, further comprising:
   receiving second text corresponding to a second user query;
   determining a second feature vector representing characteristics of the second text;
   processing the second feature vector using the first classifier to determine a third intent corresponding to the second user query;
   selecting a fourth classifier from the plurality of classifiers associated with different intents, wherein the fourth classifier is configured to identify a person name within text associated with the third intent;
   processing the second feature vector using the fourth classifier to identify a second portion of the second text, the second portion corresponding to a name of a third person;
   sending, to the knowledge base, the second portion of the second text and a second indication of the second intent; and
   receiving, from the knowledge base, a name of a fourth person corresponding to the name of the third person and the third intent.

3. The computer implemented method of claim 1, wherein the plurality of classifiers comprises the second classifier and a third classifier to identify a person name within text associated with a second intent.

4. The computer implemented method of claim 1, wherein selecting the second classifier further comprises:
   determining a first score corresponding to the first intent;
   determining a second score corresponding to the second intent; and
   selecting the second classifier based at least in part on the first score and the second score.

5. A computer implemented method comprising:
   determining first text;
   determining a first feature vector representing characteristics of the first text;
   processing the first feature vector using a first machine learning classifier to determine a first query type associated with the first text;
   identifying a plurality of machine learning classifiers comprising:
      a second machine learning classifier to identify portions of text corresponding to a first number of entities represented in queries of the first query type, wherein the second machine learning classifier is a conditional random field classifier to process feature vectors associated with the first query type, and
a third machine learning classifier to identify portions of text corresponding to a second number of entities represented in queries of a second query type;
selecting the second machine learning classifier based at least in part on determining that the second machine learning classifier is associated with the first query type and the third machine learning classifier is associated with the second query type;
processing the first feature vector the second machine learning classifier to determine a first portion of the first text representing a first entity of the first number of entities and a second portion of the text representing a second entity of the first number of entities;
sending, to a knowledge base, the first portion of the first text and a first indicator of the first query type;
determining second text;
determining a second feature vector representing characteristics of the second text;
processing the second feature vector using the first machine learning classifier to determine the second query type associated with the second text;
processing the second feature vector using the third machine learning classifier to determine a second portion of the second text representing a second entity; and
sending, to the knowledge base, the second portion of the second text and a second indicator of the second query type.

6. The computer implemented method of claim 5, wherein determining the first feature vector comprises:
dividing the first text into a first portion and a second portion;
determining first data describing characteristics of the first portion;
determining second data describing characteristics of the second portion;
determining third data describing characteristics of an entirety of the text; and
incorporating the first data, the second data, and the third data into the first feature vector.

7. The computer implemented method of claim 5, wherein processing the first feature vector using the first machine learning classifier further comprises:
determining a first score that the first text is associated with the first query type; and
determining a second score that the first text is associated with a third query type, wherein the first score is higher than the second score.

8. The computer implemented method of claim 7, further comprising, in response to the first score being higher than the second score, selecting the second machine learning classifier from a plurality of machine learning classifiers associated with different query types.

9. The computer implemented method of claim 5, wherein the first text is associated with a first device, and the method further comprises:
receiving, from the knowledge base, answer data; and
determining an output to the first device using the answer data.

10. The computer implemented method of claim 9, wherein:
determining the first text comprises:
receiving, from the first device, audio data corresponding to an utterance, and
performing speech recognition on the audio data to determine the first text;
determining the output comprises performing text-to-speech (TTS) processing on the answer data to determine speech data; and
the method further comprises sending the speech data to the first device.

11. The computer implemented method of claim 5, further comprising, prior to determining the first text:
receiving first previous query text;
determining a first previous query feature vector representing characteristics of the first previous query text;
determining a first previous query type corresponding to the first previous query text;
determining a first previous answer corresponding to the first previous query text;
processing the first previous query text, the first previous query feature vector, the first previous query type, the first previous answer, second previous query text, a second previous query feature vector, a second previous query type and a second previous answer to determine first classifier data; and
configuring, using at least in part the first classifier data, the first machine learning classifier to determine a query type associated with input text.

12. The computer implemented method of claim 11, further comprising prior to determining the first text:
determining first previous query data including the first previous query text, the first previous query feature vector, the first previous query type and the first previous answer;
processing the first previous query data to determine second classifier data;
configuring, using at least in part the second classifier data, the second machine learning classifier to determine portions of input text corresponding to entities for queries of the first previous query type;
determining that the first previous query type is different than the second previous query type;
determining second previous query data including the second previous query text, the second previous query feature vector, the second previous query type and the second previous answer;
processing the second previous query data to determine third classifier data; and
configuring, using at least in part the third classifier data, a fourth machine learning classifier to determine portions of input text corresponding to entities for queries of the second previous query type.

13. A computing system comprising:
at least one processor; and
a memory including instructions operable to be executed by the at least one processor to configure the system to:
determine first text;
determine a first feature vector representing characteristics of the first text;
process the first feature vector using a first machine learning classifier to determine a first query type associated with the first text;
identify a plurality of machine learning classifiers comprising:
a second machine learning classifier configured to identify portions of text corresponding to a first number of entities in queries of the first query type, wherein the second machine learning classifier is a conditional random field classifier to process feature vectors associated with the first query type, and a third machine learning classifier configured to identify portions of text corresponding to a second number of entities in queries of a second query type;

select the second machine learning classifier based at least in part on determining that the second machine learning classifier is associated with the first query type and the third machine learning classifier is associated with the second query type;

process the first feature vector using the second machine learning classifier to determine a first portion of the first text representing a first entity of the first number of entities and a second portion of the text representing a second entity of the first number of entities;

send, to a knowledge base, the first portion of the first text and a first indicator of the first query type;

determine second text;

determine a second feature vector representing characteristics of the second text;

process the second feature vector using the first machine learning classifier to determine the second query type is associated with the second text;

process the second feature vector using the third machine learning classifier to determine a second portion of the second text representing a second entity; and send, to the knowledge base, the second portion of the second text and a second indicator of the second query type.

14. The computing system of claim 13, wherein memory further includes instructions that configure the system to determine the first feature vector by:

dividing the first text into a first portion and a second portion;

determining first data describing characteristics of the first portion;

determining second data describing characteristics of the second portion;

determining third data describing characteristics of an entirety of the text; and incorporating the first data, the second data, and the third data into the first feature vector.

15. The computing system of claim 13, wherein the instructions that configure the system to process the first feature vector using the first machine learning classifier further configure the system to determine a first score that the first text is associated with the first query type and to determine a second score that the first text is associated with a third query type, wherein the first score is higher than the second score.

16. The computing system of claim 15, wherein the memory further includes instructions that further configure the system to, in response to the first score being higher than the second score, select the second machine learning classifier from the plurality of machine learning classifiers associated with different query types.

17. The computing system of claim 13, wherein the first text is associated with a first device, and the memory further includes instructions that further configure the system to:

receive, from the knowledge base, answer data; and determine an output to the first device using the answer data.

18. The computing system of claim 17, wherein:

the instructions that configure the system to determine the first text comprise instructions that further configure the system to:

receive, from the first device, audio data corresponding to an utterance, and perform speech recognition on the audio data to determine the first text;

the instructions that configure the system to determine the output comprise instructions that further configure the system to perform text-to-speech (TTS) processing on the answer data to determine speech data; and the memory further includes instructions that configure the system to send the speech data to the first device.

* * * * *